(12) United States Patent
Cartwright et al.

(10) Patent No.: US 8,517,618 B2
(45) Date of Patent: Aug. 27, 2013

(54) WEIGHING SCALE WITH CASSETTE DEVICE THAT MOVES PRINT HEAD UPON INSERTION WITH LABEL PRINTER

(75) Inventors: Kevin R. Cartwright, West Midlands (GB); Nicholas L. Barnes, Worcester (GB); Junior Lescott, West Midlands (GB); Ian Taylor, Warwickshire (GB); Denis Montagutelli, Angers (FR)

(73) Assignee: Illinois Tool Works Inc., Glenview, IL (US)

( * ) Notice: Subject to any disclaimer, the term of this patent is extended or adjusted under 35 U.S.C. 154(b) by 199 days.

(21) Appl. No.: 12/835,666

(22) Filed: Jul. 13, 2010

(65) Prior Publication Data
US 2011/0013962 A1    Jan. 20, 2011

(30) Foreign Application Priority Data
Jul. 14, 2009 (GB) .................................. 0912167.4

(51) Int. Cl.
| | | |
|---|---|---|
| *B41J 15/02* | (2006.01) | |
| *B41J 15/04* | (2006.01) | |
| *B41J 29/12* | (2006.01) | |
| *B41J 29/13* | (2006.01) | |
| *G01G 19/415* | (2006.01) | |
| *G01G 23/38* | (2006.01) | |

(52) U.S. Cl.
USPC ................ 400/613; 400/693; 177/2; 177/238

(58) Field of Classification Search
CPC .......................... B65C 9/1892; G01G 19/4144
USPC ................ 177/2, 8, 238, 241; 400/208, 613, 400/693
See application file for complete search history.

(56) References Cited

U.S. PATENT DOCUMENTS

| | | | |
|---|---|---|---|
| 4,700,791 A | 10/1987 | Iwasaki et al. | |
| 4,747,716 A | 5/1988 | Van Der Eikel | |
| 4,765,765 A * | 8/1988 | Futakata ...................... | 400/614 |
| 4,896,166 A | 1/1990 | Barker et al. | |
| 5,020,926 A | 6/1991 | Wilhelm | |
| 5,366,302 A | 11/1994 | Masamura et al. | |
| 5,397,190 A | 3/1995 | Iida | |

(Continued)

FOREIGN PATENT DOCUMENTS

| | | |
|---|---|---|
| CN | 201193958 Y | 2/2009 |
| EP | 0153761 A2 | 9/1985 |

(Continued)

OTHER PUBLICATIONS

European Search Report issued on Nov. 9, 2010 in connection with European Patent App. No. 10169312.5.

(Continued)

*Primary Examiner* — Daniel J Colilla
(74) *Attorney, Agent, or Firm* — Levenfeld Pearlstein, LLC

(57) ABSTRACT

A cassette device is arranged to be removably mounted to or inserted into a printing device of a weighing scale housing a print-head mechanism and a drive roller. The cassette device includes a feed hub and a take-up hub rotatably mounted to a wall for cooperating with the drive roller. The wall forms a part of or closure for the weighing scale housing. Label roll end sensing, backing paper tension control, print head movement and pressure adjustment, and label feed/print line alignment arrangements are also described.

25 Claims, 11 Drawing Sheets

(56) References Cited

U.S. PATENT DOCUMENTS

| | | | |
|---|---|---|---|
| 5,419,648 A * | 5/1995 | Nagao et al. | 400/208 |
| 5,450,116 A | 9/1995 | Weiselfish et al. | |
| 5,556,492 A | 9/1996 | Vonderhorst | |
| 5,615,960 A * | 4/1997 | Mori et al. | 400/613 |
| 5,694,159 A | 12/1997 | Kajiya et al. | |
| 5,882,126 A * | 3/1999 | Bowling | 400/55 |
| 6,017,159 A * | 1/2000 | Tse | 400/208 |
| 6,585,437 B1 | 7/2003 | Wiklof et al. | |
| 2002/0031388 A1* | 3/2002 | Palmer et al. | 400/615.2 |
| 2004/0090642 A1 | 5/2004 | Hikita | |
| 2004/0168834 A1* | 9/2004 | Teraoka et al. | 177/2 |
| 2004/0184862 A1 | 9/2004 | Shibata et al. | |
| 2005/0036816 A1 | 2/2005 | Carriere | |
| 2005/0276645 A1 | 12/2005 | Hirte et al. | |
| 2006/0008311 A1 | 1/2006 | Miyasaka et al. | |
| 2006/0171754 A1 | 8/2006 | Takami et al. | |
| 2009/0016797 A1 | 1/2009 | Brugue et al. | |
| 2009/0120578 A1 | 5/2009 | Ogawa | |
| 2009/0285617 A1* | 11/2009 | Vandermeulen | 400/621 |

FOREIGN PATENT DOCUMENTS

| | | | |
|---|---|---|---|
| EP | 0225121 A2 | 6/1987 | |
| EP | 0400652 A2 | 12/1990 | |
| EP | 0602709 A1 | 6/1994 | |
| EP | 0765761 A1 | 4/1997 | |
| EP | 1679198 A2 | 7/2006 | |
| GB | 2263467 A | 7/1993 | |
| GB | 2350832 A | 12/2000 | |
| GB | 2396847 A | 7/2004 | |
| GB | 2404896 A | 2/2005 | |
| GB | 2448305 A | 10/2008 | |
| GB | 2449676 A | 12/2008 | |
| JP | 59155085 A | 9/1984 | |
| JP | 62111861 A | 5/1987 | |
| JP | 63160959 A | * | 7/1988 |
| JP | 63165723 A | * | 7/1988 |
| JP | 05077824 A | * | 3/1993 |
| JP | 07043198 A | * | 2/1995 |
| JP | 07246752 A | * | 9/1995 |
| JP | 10157247 A | * | 6/1998 |
| JP | 2000247502 A | 9/2000 | |
| JP | 2001038966 A | 2/2001 | |
| JP | 2001130111 A | 5/2001 | |
| JP | 2001187662 A | 7/2001 | |
| JP | 2003073001 A | 3/2003 | |
| JP | 2005247568 A | 9/2005 | |
| JP | 2007216515 A | 2/2006 | |
| JP | 2007216515 A | 8/2007 | |
| JP | 2007246224 A | 9/2007 | |
| JP | 2009014455 A | 1/2009 | |
| JP | 2009107305 A | 5/2009 | |
| WO | 9834791 A1 | 8/1998 | |
| WO | 03029013 A1 | 4/2003 | |

OTHER PUBLICATIONS

European search report issued by the European Patent Office on Oct. 18, 2010, in connection with EP Pat. App. No. 10169313.3.

Extended European Search Report issued by the EPO in connection with corresponding EP App. No. 11174569.1 on Dec. 12, 2011.

European Search Report issued on Sep. 21, 2010 in connection with European Patent App. No. 10169306.7.

* cited by examiner

Fig.13
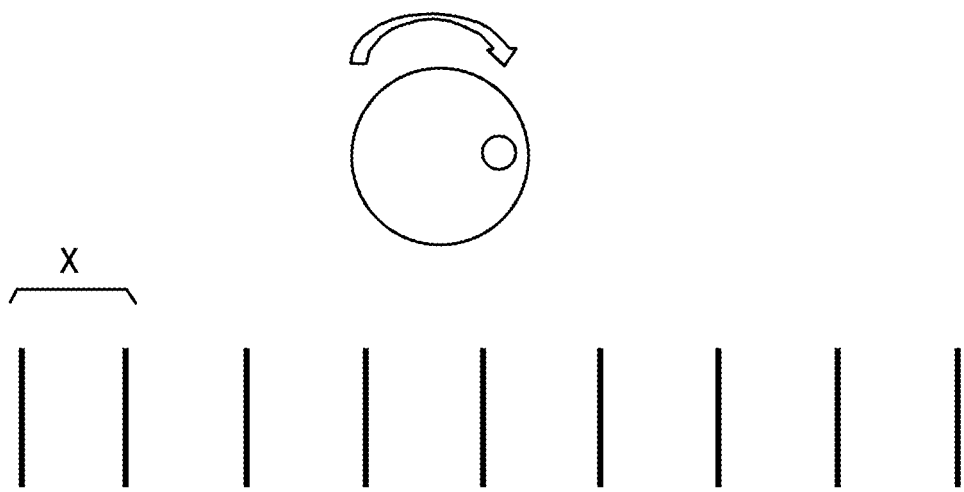
Fig.14
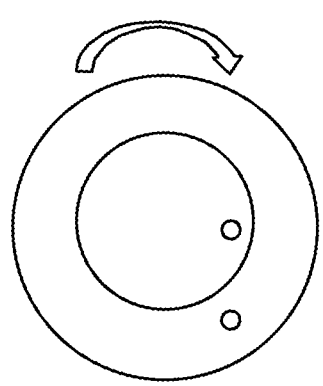
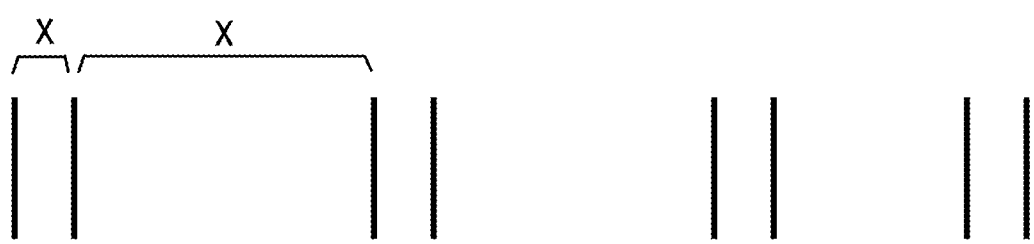

WEIGHING SCALE WITH CASSETTE DEVICE THAT MOVES PRINT HEAD UPON INSERTION WITH LABEL PRINTER

BACKGROUND OF THE INVENTION

The present invention relates to a label printing device, particularly although not exclusively as may be used in a weighing scale.

Commodity items such as fresh foods, e.g. fresh meat, fish, fruit and vegetables, are often sold by weight. Fresh food departments, such as deli departments in supermarkets which utilise slicers or the like to dispense food products from a bulk quantity, use weighing scales to weigh the dispensed product. Based on its price per unit weight the scale calculates a sub-total price of the item or dispensed product. A printing device incorporated into the weighing scale then prints a label showing the sub-total price and/or a barcode which is scanned at a Point-of-Sale (POS) or check-out register. The blank labels for printing on are removably adhered in series at prescribed intervals on a roll of backing paper and held in a cassette or cartridge that can be inserted into and extracted from the weighing scale to enable the operator to change the roll whenever it runs out. Typically, a label cassette in the art includes a feed reel or hub for holding a roll of labels on a backing paper, a drive roller or capstan assembly to drive the labels over a peeling edge, and a take-up reel or hub for taking up the expended backing paper once the labels have been removed from it. The drive roller assembly typically comprises a rubber drive roller and a metal pinch roller between which the labels and their backing paper are fed. The backing paper is somewhat more flexible than the label itself. After printing, each label is separated from the backing paper simply by bending the backing paper sharply away from the label, which is usually done by drawing the backing paper over a fairly sharp edge or peeling edge. The less flexible label then separates from the backing paper. It is important that there is sufficient tension in the backing paper so as to enable the label to separate as the backing paper is fed over the peeling edge. In order to maintain the tension of the backing paper between the drive roller and the take-up reel, both the drive roller and the take-up reel in prior art label cassettes are driven by one motor or by respective motors in the weighing scale and are mechanically linked in the cassette by means of a gearing assembly or by means of a drive belt which drivingly engages the motor(s) in the scale when the cassette is in place. For example a gear in the cassette gear assembly may engage with a motor driven gear in the weighing scale.

However, as the backing paper is continually wound onto the take-up hub, the take-up reel radius increases and hence the take-up hub has to turn more slowly, given a substantially fixed label feeding speed governed by the drive roller assembly. The variable rotational speed of the take-up hub relative to the drive roller is compensated for by means of a slip clutch on the take-up hub/reel. The slip clutch acts so that the torque on the take-up hub/reel is kept below a predetermined threshold. If the torque exceeds this threshold the clutch slips thereby preventing the backing paper between the drive roller and the take-up hub/reel from ripping. However, by maintaining a constant torque, a change in the radius of the backing paper wound onto the take-up hub will cause the tension of the backing paper between the take-up hub and the drive roller to change. In an extreme case, (when the take-up hub is empty or near empty) the tension may go beyond a predetermined threshold of the backing paper causing the paper to rip. At the other extreme, with a full or near-full take-up hub, the backing paper may become slack, thereby creating a loop of backing paper between the take-up hub/reel and the drive roller which may become entangled within the cassette. Such slackness may also result in the bend in the backing paper around the peeling edge becoming insufficiently sharp to separate the printed labels, which are therefore rolled up on the take-up reel/hub, rather than being dispensed.

Replacing an expended label roll with a fresh label roll typically requires manually feeding a free end of the label roll through guides within the label cassette from feed reel/hub through the drive roller assembly and onto the take-up reel/hub. This is very time consuming and inconvenient to customers if carried out whilst they are waiting at a service counter or till. This problem is addressed by keeping at least one "spare" cassette which is loaded with fresh labels "offline" whenever convenient, whilst the other cassette is "online", i.e. in use in the weighing scale. When the "online" cassette is exhausted, it can be simply exchanged for the full "offline" cassette, thereby minimising scale downtime. The now empty "offline" cassette can then be refilled before the "online" cassette runs out again. However, the number of label cassette devices that a supermarket or convenience store can hold is very much dependent upon their cost. They tend to be expensive due to the many different mechanical components which they contain. A typical label cassette as taught in JP2009014455 (Ishida Seisakusho) comprises a drive roller assembly, a take-up hub and a gear assembly to mechanically link both of these for driving engagement with drive means in the scale. All of these components are supported on a metallic chassis and housed in a plastic covering.

Despite time saving measures at the service counter or check-out by keeping spare loaded label cassettes, there is still an increasing emphasis in supermarkets to further reduce waiting times and simplify the procedure for changing label cassettes. The number of operations to change a typical label cassette in a weighing scale is usually three or more. These include any one of the following procedures:
  i) releasing a door to access the area of the label cassette,
  ii) lifting the printing head to disengage it from the label or backing paper of the expended cassette,
  iii) removing the expended cassette
  iv) inserting a new cassette
  v) re-engaging the print-head on the fresh label/backing paper
  vi) closing the access door.

In an attempt to reduce the number of operations required to replace an expended label cassette device, JP2009014455 (Ishida Seisakusho), describes a front loading label cassette for a weighing scale in which the print head rocks open and closed in a vertical direction with the insertion or extraction of the label cassette. This reduces the number of operations to replace the label cassette in a weighing scale to only one operation. However, despite the improvements made in reducing the number of operations, this has not reduced the complexity and manufacturing expense of the label cassette. Hence there is reluctance by shop owners and managers to keep sufficient numbers of spare label cassettes. Thus there is a need to provide a low cost label cassette device that can be inserted into and extracted from a weighing scale with a minimum number of operations.

Whereas an operator recognises that a till roll is nearly finished by means of a mark such as a red line on the last remaining portion the roll, no such indication method exists for labels. Even if such marks are used, not only does this destroy the aesthetic appearance of the last few remaining labels but in some cases would take the operator by surprise and therefore, offers the operator very little opportunity and time to make preparations to change the supply roll for a fresh roll of labels. One way the industry has tried to tackle this problem is by providing quick changeable label cassettes as described above. More sophisticated methods involve using software techniques whereby a sensor and a processor count the number of labels dispensed from the print head mechanism and knowing the number of labels on a fully charged roll, the remaining number of labels on the roll can thus be calculated. When the remaining number of labels reduces to a predetermined threshold quantity, the weighing scale provides a warning to the operator that the labels are about to run out. Although feasible, this method still suffers from a number of drawbacks. Firstly, the technique will only work when the roll is changed whilst the weighing scale is left powered on or in an active state and if changed when the scale is de-activated, the memory needs to be reset to erase counts from a previous roll. If, for example, an operator de-activates the weighing scale and changes the roll well before a roll end warning has been given, the processor will still have a record of the number of labels dispensed from the previous roll. When the weighing scale is re-activated, this number together with the number of labels dispensed from the new roll leads to confusion as the threshold number of labels dispensed is reached early and the processor provides warning signals to the operator well before the new roll has actually run out. Thus, there is a need to provide a cassette device to be removably mounted in or to a printing device of a weighing scale, that indicates when the roll of labels is coming to its end, and which does not suffer from the above problems.

It is necessary in label printing machines that the label on its backing paper is accurately positioned adjacent the print head. This becomes more critical where a label such as found in typical a supermarket is divided into areas separated by borders, each area being printed with specific information associated with the commodity item such as a barcode, the price per unit weight, the subtotal, other product specific information, or general information, special offers, etc. To enable the printing device to locate designated areas of the label, it is necessary that the portion of the label for printing is positioned in registration with a print line of the print head, otherwise a portion of the label ahead of the print head line becomes wasted. Prior art labelling machines as taught in U.S. Pat. No. 5,556,492 (Vonderhorst, J. P) utilise a label sensor positioned along the feed path through the labelling machine to sense the label, the gaps between the labels or other indicia on the backing paper or labels and to send signals to a controller for controlling stopping and starting of the drive roller at the precise time required. To make full use of the area of the label, prior art label cassette devices try to re-position a blank label on the backing paper so that the selected area is aligned with the print line of the print head after the previously printed label is issued. Such re-positioning methods involve rotating the drive roller assembly and the take-up hub backwards a sufficient amount so that the next blank label is positioned in registration with the print line of the print head. This rewinding is necessary because, in order to fully peel off and present a printed label to a customer/sales assistant for detachment from the backing paper, the next label on the backing paper is transported beyond the ideal first line printing position. The problem associated with this method is that to ensure that the previous printed label has been detached, the rewinding does not take place until the weighing scale has been activated for printing the next label. There is thus a dead time following printing activation until the printing device re-positions the next blank label properly in registration with the print line of the print head before printing starts. The customer therefore experiences the noise of the motors driving the labels and carrier paper backwards but there is a delay before a printed label actually emerges. In an extreme case, this can leave the customer or operator frustrated particularly as this delay can be significant when attempting to print a number of labels. Thus a continuous printing mechanism for labels is required that does not suffer from the above problems of the delay and "noise without apparent useful activity".

BRIEF SUMMARY OF THE INVENTION

The present applicant has mitigated at least one of the above problems by providing a cassette device arranged to be removably mounted to or inserted into a printing device of a weighing scale housing a print-head mechanism and a drive roller, the cassette device comprising a feed hub and a take-up hub rotatably mounted to a wall for cooperating with the drive roller, and wherein the wall forms a part of or closure for the weighing scale housing. Whereas in prior art cassette devices the take-up hub is mechanically linked to the drive roller in the cassette device such as by means of a gearing assembly or drive belt, transferring some of the moving parts such as the drive roller to the printing device reduces the number of components in the cassette device which in turn reduces the cost of manufacture of the cassette device. Having a wall that forms part of or a closure for the weighing scale housing reduces the number of operations necessary to assemble or load the cassette device onto the weighing scale, i.e. there is no need to have a separate door assembly on the weighing scale to accommodate the cassette device. Whereas the chassis to support a gearing assembly in the prior art label cassette devices is usually in metal, there is a risk that the gearing assembly could be damaged or miss-aligned through misshandling or even dropping the cassette, the danger of which is increased due to the sheer weight of the cassette. The reduction in the number of moving parts forming the cassette device in the present invention, more particularly the absence of the mechanical linkage between the drive roller and the take-up hub in the cassette device, increases the robustness of the label cassette against miss-handling. More importantly, this reduction in the number of components forming the cassette device of the present invention allows the bulk of the cassette device to be fabricated from a single material such as plastic, thereby reducing the weight of the device. Preferably, the cassette device comprises an integrally moulded frame. Unlike prior art label cassette devices, the label cassette device in the present invention is more akin to a simple carrier for a roll of labels.

Having the wall of the cassette device form a part of or closure for the weighing scale housing allows an actuating mechanism to be incorporated into the cassette device, e.g. movably mounted to the wall, for actuating the print-head mechanism to move towards the drive roller as the cassette is mounted/inserted. This is so to engage/disengage with the labels and backing paper in use when mounting or de-mounting the cassette device to or from the weighing scale respectively. This removes the need to separately lift/lower the print-head mechanism and thereby reduces the number of operations to change a cassette device of the present invention. Preferably, the actuating mechanism comprises a protrusion having a cam surface that cooperates with the print head mechanism to urge the print head towards the drive roller or label or backing paper in use. More preferably, the protrusion is moveable relative to the wall from a retracted position in which the print-head mechanism is spaced apart from the drive roller or the label, to an extended position to urge the print-head mechanism against the drive roller or the label in use. Creating a space between the print-head mechanism and the drive roller prevents the backing paper or labels therebetween from snagging or rubbing against the print-head mechanism when the label cassette is being inserted into/withdrawn from the printing device of the weighing scale. Once the cassette device is loaded into the printing device such that the backing paper and labels are properly aligned with the print-head, further movement of the protrusion to the forward position urges the print head to a position in which it can operatively engage and print on the labels. Preferably, one end of the protrusion is wedge shaped so as preferably to engage with a sloped surface of the print head mechanism to cause the urging of the print head mechanism against the drive roller or the labels.

Preferably, the actuating mechanism further actuates a detent to releasably resist removal of the cassette device from the printing device. Simultaneously actuating a detent reduces the number of operations to insert or remove the cassette device into/from the printing device. Preferably, the detent comprises a finger having a cam surface which cooperates with a latch in the printing device. More preferably, the actuating mechanism comprises a handle that cooperates with the detent to simultaneously actuate the detent and the printhead urging mechanism. The handle is moveable relative to the remainder of the cassette to move the protrusion from the retracted position such that the print-head mechanism is spaced apart from the drive roller or label in use to a forward position to urge the print head mechanism against the drive roller or label in use. To prevent accidental actuation of the handle when the label cassette device is removed from the printing device of the weighing scale (as this will cause the labels and backing paper to snag or foul with the printing head mechanism when the cassette is inserted), the actuation mechanism preferably further comprises an interlock. The interlock is moveable from a first position to prevent actuation of the handle to a second position to allow actuation of the handle, such movement taking place as the cassette is inserted. As the cassette is withdrawn, the interlock returns to the first position.

In prior art cassette devices, sensors are used to determine whether the roll of labels has run out and in less sophisticated methods it is possible to provide an indication mark such as a red line on the last few remaining labels. However, such techniques are fraught with problems as discussed above. Another aspect of the present invention provides a method of determining the amount of labels and/or backing paper on a hub in a cassette device of the present invention comprising the steps of:
  a. determining a first value related to the radius or diameter of the hub and the roll of labels and/or backing paper wound thereon;
  b. determining a second value related to the radius or diameter of the hub wherein the difference between the first value and the second value is an indication of the size of the roll of labels and/or backing paper on the hub.

Measuring the size of the roll (roll outer radius minus roll inner radius) provides an indication of the amount of labels left on the hub in the cassette. Even if the weighing scale is de-activated or switched off, on activation the size of the roll of labels/backing paper on the hub can be re-calculated. Such a method provides the advantage of continuous real time monitoring and therefore does not suffer from the problem found in prior art devices. Preferably, the present invention provides a cassette device arranged to be removably mounted in or to a printing device of a weighing scale, the cassette comprising a feed-hub and a take-up hub, wherein the feed or take-up hub comprises a signal generating means which produces a signal upon rotation of the hub, e.g. one pulse per revolution. The signal generating means may comprise a hub marker which moves past and is detectable by a hub sensor with each revolution to produce pulses whose frequency is indicative of the angular velocity of the hub. Thus the angular velocity is given by:

$$2\pi \times p_{hub} = \omega_{hub} \qquad (1)$$

where $p_{hub}$ is the number of pulses over a time period (pulse frequency) from one or other of the signal generating means, and $\omega_{hub}$ is the angular velocity of the hub.

The linear velocity of the labels is given by the equation:

$$v = r \times \omega \qquad (2)$$

where v is the linear velocity of the labels, $\omega$ is the angular velocity of the hub concerned (in this case 'the feed hub')

r is the overall (outer) radius of the roll of labels on the hub, i.e. the reel.

Knowing the linear velocity of the labels and the angular velocity of the hub, the overall radius of the hub, more preferably a feed hub, together with the backing paper (and any labels) wound thereon can be determined from equation (2).

Rolls of labels usually have different hub diameters. Typical hub diameters are 13 mm and 38 mm. The smaller diameter is typically used with receipt paper; or a continuous label strip from which lengths are torn off as needed, still stuck to portions of backing paper. The larger diameter is typically used with individual labels separated from a backing paper and dispensed using a peel edge. In order to accommodate the different hub diameters, the feed-hub is preferably made up of a removable outer feed hub sleeve and an inner feed hub core having a predetermined diameter. The signal generating means preferably comprises a first marker on a removable outer feed hub sleeve and a second marker on an inner core of the feed hub, the first marker denoting the presence of the outer feed hub sleeve and the second marker denoting the presence of the inner core of the feed hub. Preferably, substantially evenly spaced pulses indicate the presence of the feed-hub core alone and differently spaced pulses indicate the presence of the feed hub sleeve and the feed hub core. This is dependent on the first and second markers not being angularly displaced from each other by 0 or 180 degrees (0 or $\pi$ radians). Alternatively, the feed hub sensor comprises a first feed hub sensor and a second feed hub sensor wherein detecting pulses by the first feed hub sensor is an indication of the presence of a feed hub core and detecting pulses by the second feed hub sensor is an indication of the presence of a feed hub sleeve.

A method of determining the radius of a hub together with backing paper and/or labels wound thereon comprises:
  a) determining the angular velocity of the hub;
  b) determining the linear velocity of the backing paper/labels.

A method of determining the linear velocity of the labels/backing paper is by determining the angular velocity of a drive roller having a predetermined radius, i.e. applying equation (2) to the drive roller. Preferably, the drive roller is driven by a stepper motor such that each time the motor is stepped, the label advances by a predetermined amount. Thus for each step rotation of the drive roller, the label advances by a predetermined amount. Knowing the driving frequency of the stepper motor, its angular velocity can therefore be determined. The label linear velocity can thus be calculated by applying equation 2 above, in which $\omega$ is the angular velocity of the drive roller and r is the radius of the drive roller.

Preferably the present invention also provides a printing device for cooperation with cassette devices as described, the printing device comprising a print-head mechanism and a drive roller drivingly engageable with the labels and/or the backing paper in the cassette device. Preferably, the print-head mechanism is moveable from a first position in which it is spaced apart from the drive roller or labels/backing paper to a second position in which it is urged towards the drive roller or labels/backing paper. More preferably, the print-head mechanism biased towards the first position, i.e. in a direction away from the drive roller or labels/backing paper, and still more preferably the print head mechanism comprises a movable (e.g. pivotable) carrier arm. The print-head mechanism such as the carrier arm has means to cooperate with the actuating mechanism of the cassette device, more particularly a cam surface of the protrusion of the cassette device so as to urge the print-head mechanism towards the drive roller or labels/backing paper in use. Separately from the resilient biasing of the print head mechanism away from the drive roller or the backing paper and labels, to ensure that a print head of the print head mechanism is sufficiently urged against the labels in use, the print-head is preferably resiliently mounted to that part of the print head mechanism which is engaged by the actuating mechanism of the cassette device, e.g. the print-head carrier arm, where present. Preferably, the print-head is resiliently mounted to the print head mechanism (e.g. carrier arm) by an adjustable spring. Preferably, at least one further mounting spring is provided between the print head and print head mechanism, spaced from the adjustable spring in the transverse direction of the labels/backing paper. This enables adjustment of the print head to provide even pressure across the width of the labels, e.g. when they are considerably narrower than the print head and positioned towards one side thereof. Preferably, the adjustable spring comprises a rotatable member having a cam surface arranged to adjust the deformation of the adjustable spring in use.

In order to clean the print head, it is convenient if the print head may be mechanically urged into its normal operative position against suitable cleaning media, with the cassette device removed. Thus, advantageously the printing device additionally has means to move the print-head mechanism against the print head mechanism bias and hold it substantially in its normal operative position, with the cassette device removed. Such means may comprise a rotatable member having a cam surface that engages with the print-head mechanism to urge the print-head mechanism against the cleaning medium in use. More preferably, the rotatable member engages with the print-head carrier arm to urge the print-head mechanism against the cleaning medium in use.

Preferably, the drive mechanism for driving the drive roller and the take-up hub comprises a stepper motor. The advantage of using a stepper motor is that the motor's position can be controlled precisely, without any feedback mechanism. The printing device preferably comprises a take up shaft for cooperation with the take-up hub of the cassette device.

In prior art systems, tools are required to remove the print head as it is held in the print head mechanism carrier arm by fasteners such as screws. Not only does this require tools to remove the old print head but the work required to remove the old print head introduces an unnecessary delay. The present invention has overcome this problem by providing a printing device for printing on labels releasably adhered to a backing paper, in which the printing device cooperates with a cassette device comprising a feed hub and a take-up hub and comprises a print head and a print head mechanism wherein the print head is held to the print head mechanism by a frictional engagement. By means of such frictional engagement, the print head is sufficiently secured to the print head mechanism for the purpose of printing and yet advantageously is readily removable for servicing or replacement without the use of tools. More preferably, the print head is slideably mounted to the print head mechanism, e.g. to a carrier arm as previously described.

In yet another aspect of the present invention, a device for placing a portion of a label releasably adhered on a backing paper in a predetermined alignment to a print head is provided, comprising
 a. a label sensor operative to detect when a label has been detached from the backing paper,
 b. a drive mechanism to move the backing paper relative to the print head, wherein upon operation of the label sensor, the drive mechanism moves the backing paper such that another label is positioned in a predetermined alignment with the print head.

Not only does this ensure that the next label is correctly aligned adjacent the print head after issue of a first label, but the operator or the customer experiences a continuous labelling system without seemingly ineffective noise and delay associated with drive motors re-positioning the next label only after the next print request, and not immediately after the previously printed label is taken. Preferably, the drive mechanism automatically rewinds the backing paper a predetermined amount such that the another label is aligned with the print head. More preferably, the label sensor is located adjacent a dispensing aperture.

In prior art label printing devices, a slip clutch maintains a substantially constant torque on the take-up hub. However, as the radius or diameter of the accumulation of backing paper wound on the take-up hub increases, by virtue of the equation below, the tension imparted on the backing paper falls.

$$T_n = T_q/r \tag{3}$$

Where $T_n$ is the tension on the backing paper,
 r is the radius of the take-up spool, including the backing paper taken up, and
 $T_q$ is the torque at the take-up hub, equal to the limiting torque of the slip clutch.

As the correct tension on the backing paper between the drive roller and the take-up hub is necessary to cause the label to separate from the backing paper as it is fed over a peel edge and to avoid tearing of the backing paper, in yet another aspect of the present invention, a method for controlling the tension of a backing paper between a drive roller and a take-up hub in a labelling device comprises the steps of:
 a. driving the take-up hub through a resilient connection
 b. determining a displacement of the resilient connection corresponding to a desired backing paper tension
 c. determining a current radius, diameter or depth of the paper on the take-up hub from the change in displacement of the resilient connection over a time interval and
 d. controlling the take-up hub angular speed using the current radius, diameter or depth so as to substantially maintain the desired backing paper tension.

Preferably, an initial torque is derived from a predetermined tension value and a predetermined radius of the take-up hub, using eqn. (3). This enables an initial value of the take-up hub torque to be calculated from the desired value of the tension and an assumed radius. Initially, the assumed radius can be taken to be the radius of the bare take-up hub. However, once the accumulated backing paper increases in diameter, a larger torque will be required to maintain the same tension in the paper (see eqn. (3)). Therefore to maintain the correct (substantially constant) paper tension $T_n$, the increased radius must be determined.

If the take-up motor is driven at substantially the same speed over this time interval, a mismatch will develop between the take-up hub position and the backing paper position. This mismatch can be taken up by the resilient rotational connection provided between the take-up drive motor and the take-up hub. This resilient connection can act as a torque sensor, since the angular displacement at the resilient connection is substantially proportional to the transmitted torque:

$$T_q = D \cdot K \quad (4)$$

where $T_q$ is the torque at the take-up hub
D is the angular displacement at the resilient connection in radians and
K is the sensor constant that defines the angular displacement of the resilient connection at a given torque, and has units of radians/Nm.

The displacement angle and changes therein at the resilient drive connection can be appropriately sensed, e.g. using a known optical sensor.

An initial displacement of the resilient connection necessary to achieve the desired backing paper tension can be determined from eqns. (3) and (4). Where the hub drive motor is a stepper motor it can be stepped until the initial resilient drive connection angular displacement is achieved, as measured by the displacement sensor:

$$D = r \cdot T_n / K \quad (5)$$

Any change in the angular displacement at the resilient connection will also be proportional to the change in torque at the take-up hub and take-up hub motor. Thus:

$$\Delta T_q = \Delta D \cdot K \quad (6)$$

At appropriate time intervals, e.g. at each step of a capstan drive stepper motor, the change in displacement angle can be sensed and used to calculate an improved value of r, and hence a value of $\omega$, necessary to maintain $T_n$ at the desired substantially constant value. Calculation proceeds as follows.

Equating change in angular displacement with the mismatch in take-up hub drive rotational speed and paper linear speed over the time interval of interest, t and where $\Delta D$ is small:

$$r \cdot \Delta D = r \cdot \omega \cdot t - v \cdot t \quad (7)$$

and hence, the angular displacement is given by:

$$\Delta D = (\omega - v/r) t \quad (8)$$

Thus the angular displacement is as a result of the mismatch, $(\omega - v/r)$, between the linear motion of the backing paper and the rotational speed, $\omega$, of the take-up hub.

An improved value of r can thus be calculated:

$$r = \frac{v}{\omega - \frac{\Delta D}{t}} \quad (9)$$

and the required take-up hub angular speed to maintain the desired paper tension $T_n$ can be calculated:

$$\omega = v/r \quad (10)$$

The take-up hub drive motor can therefore be controlled to drive the take-up hub at this angular speed, e.g. by controlling its drive frequency in the case of a stepper motor.

In terms of the change in torque, $\Delta T_q$, substituting the change in the torque at the take-up hub in equation (6), the radius, r, of the take-up hub and the backing paper thereon (take-up reel) is thus given by the equation:

$$r = \frac{v}{\left(\frac{\Delta T_q}{t \times K}\right) - \omega} \quad (11)$$

where $\Delta T_q$ is the change in torque on the take up motor.

Thus the computed radius will be continually updated and from the measured torque, the tension is thus computed.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 13 is an example of an array of pulses denoting the presence of the feed hub core only;

FIG. 14 is an example of an array of pulses denoting the presence of the outer feed hub sleeve as well as the core;

DETAILED DESCRIPTION OF THE INVENTION

Figure 1:
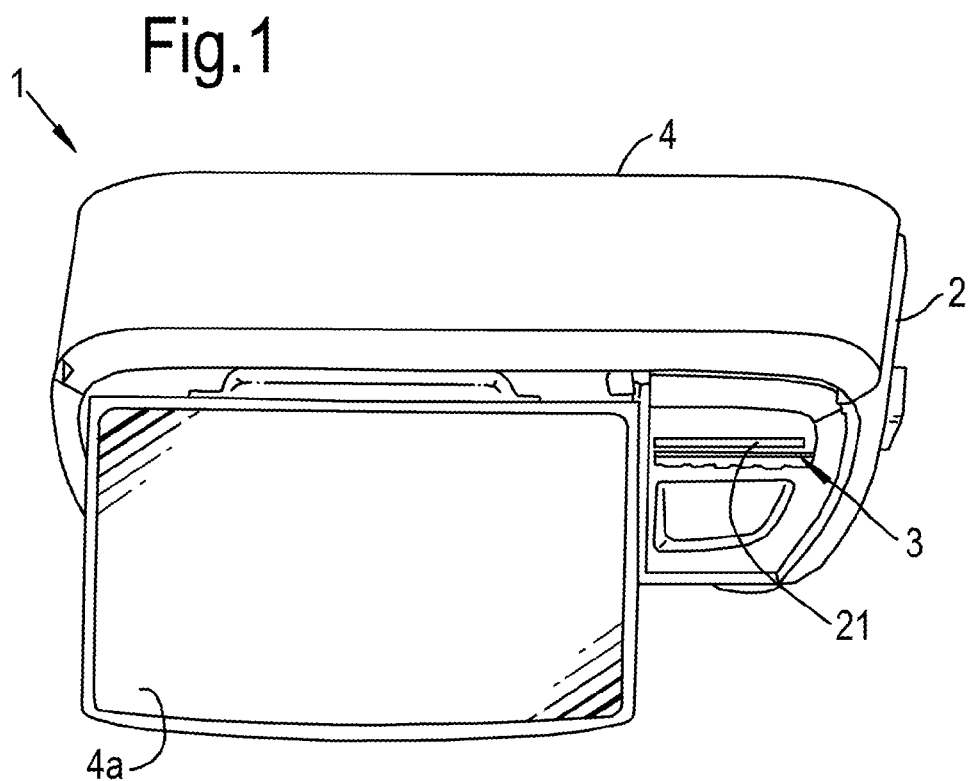
FIG. 1 is a perspective view of a weighing balance and cassette device embodying the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Cassette Device and Printing Device

Figure 2:
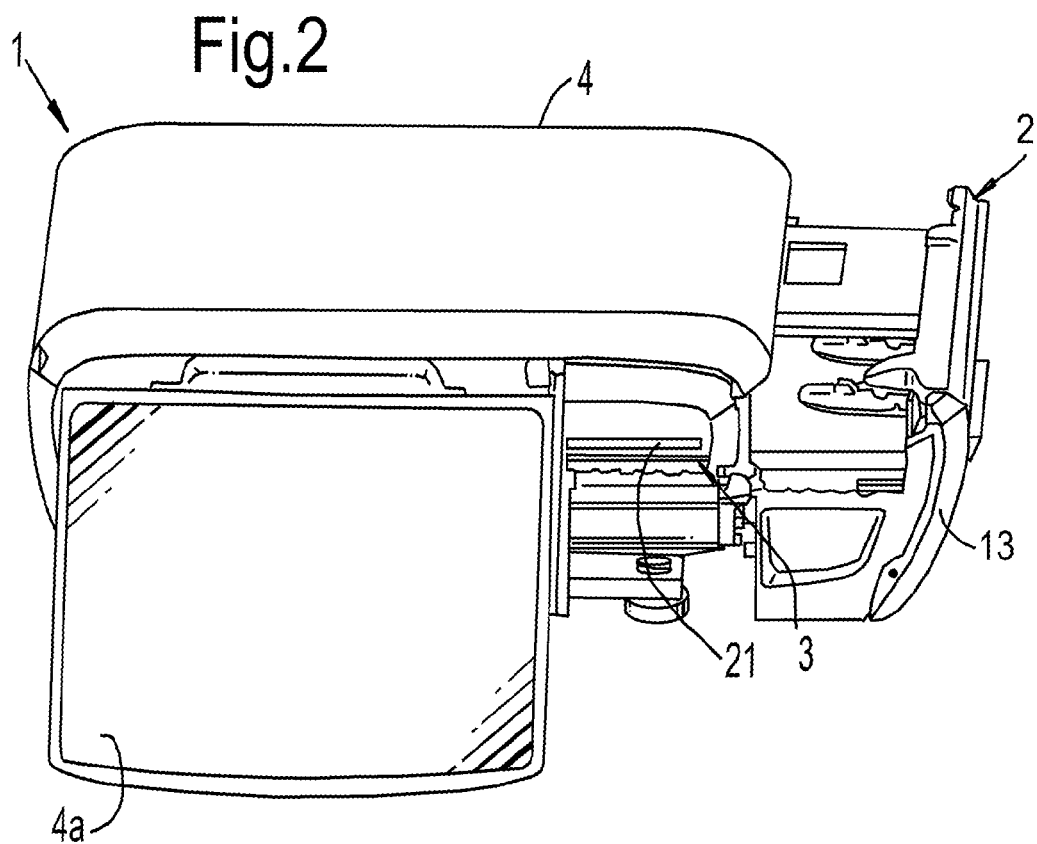
FIG. 2 is a perspective view of the weighing balance showing the cassette device partially inserted or removed.

The label printing device 3 and cassette device 2 for loading the printing device with labels is described with reference to a weighing scale 1 (see FIGS. 1 and 2) typically found in a supermarket or a convenience store. However, the present invention is not restricted to a weighing scale and can be used in other applications that require a printed label. The weighing scale comprises a top balance pan 4 for weighing commodity items such as vegetables, fruit, etc, and for example meat or cheese slices in a deli department which are priced according to their weight. The scale further comprises a display/keyboard 4a for selecting item names/categories/prices per unit weight, etc. and for displaying weights, prices etc., as is conventional. The printing device and cassette device provide the customer with a printed label showing the price and other information such as a barcode for scanning at the Point-of-Sale (POS) or check out register. The labels are typically adhered in series usually by means of a pressure sensitive adhesive at prescribed intervals to a web of backing paper with gaps in between each consecutive label. Typically the gaps between the labels are uniform. However, the present invention is also applicable to rolls of labels where the gaps between the labels are non-uniform.

Figure 6:
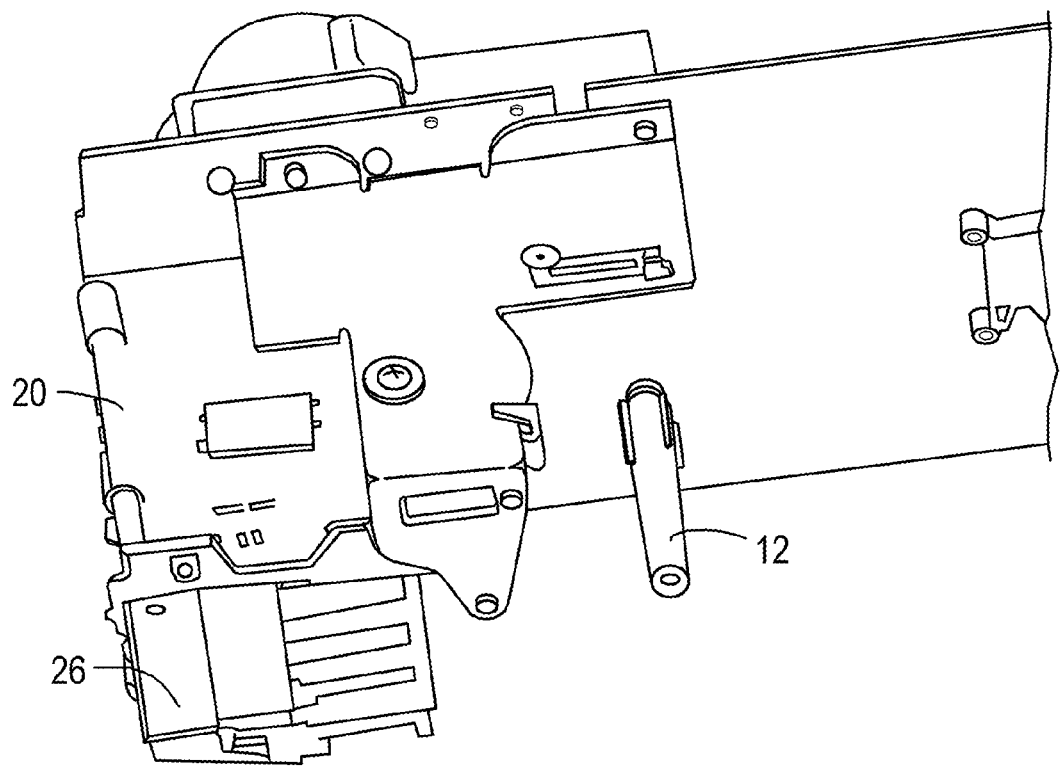
FIG. 6 shows the print head mechanism and the shaft for driving the take-up hub.

The cassette device 3 for loading labels comprises a frame or chassis 5 to which are mounted a feed hub or supply roll 6; a take-up hub 7 downstream of the feed hub 6 for taking up the expended backing paper once the labels have been printed and removed from the backing paper, and a guide member 8 for guiding the strip of backing paper over a peel edge. The passage of the backing paper through the cassette device is shown by the solid line 6a. Unlike the take-up hub 7 which is motor driven, the feed hub is undriven and free to rotate. The feed hub comprises a central feed hub core 9 and an optional, removable outer feed hub sleeve 10 each having a predetermined diameter so as to accommodate rolls of labels having corresponding, different core diameters respectively. Typically, there are two different core diameter sizes namely 13 mm and 38 mm. Unlike the feed hub 6, the take-up hub 7 is formed at its centre with a boss 11 to accommodate a motorised rotary shaft 12 of the printer device (see FIG. 6).

Figure 3:
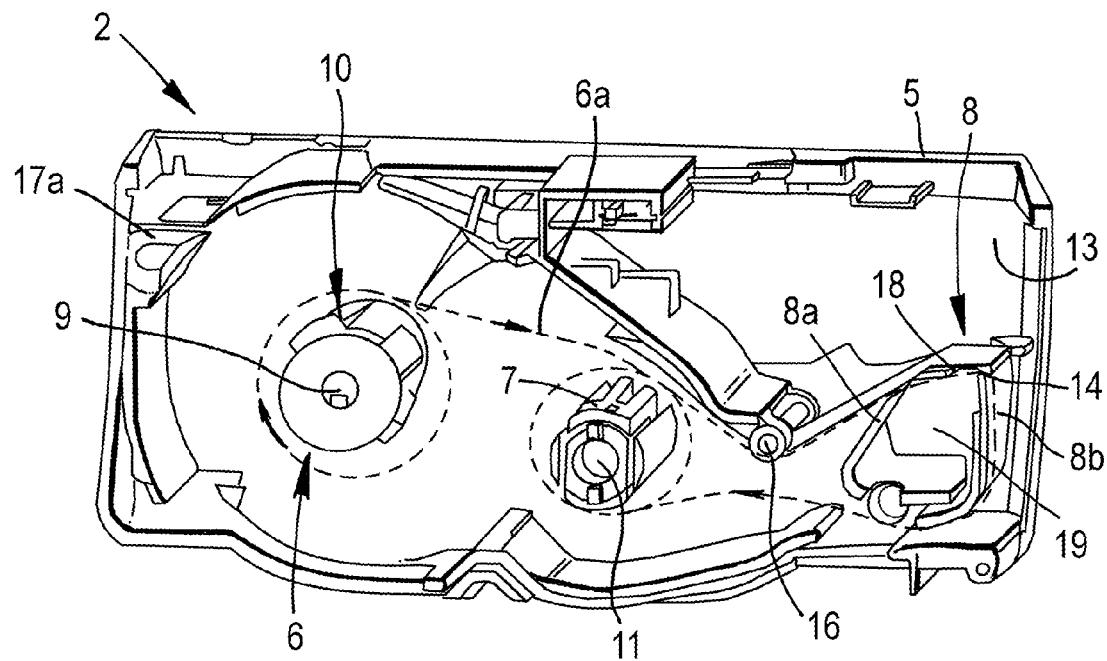
FIG. 3 is a rear ("inside") view of the cassette device of the preceding figures.
Figure 4:
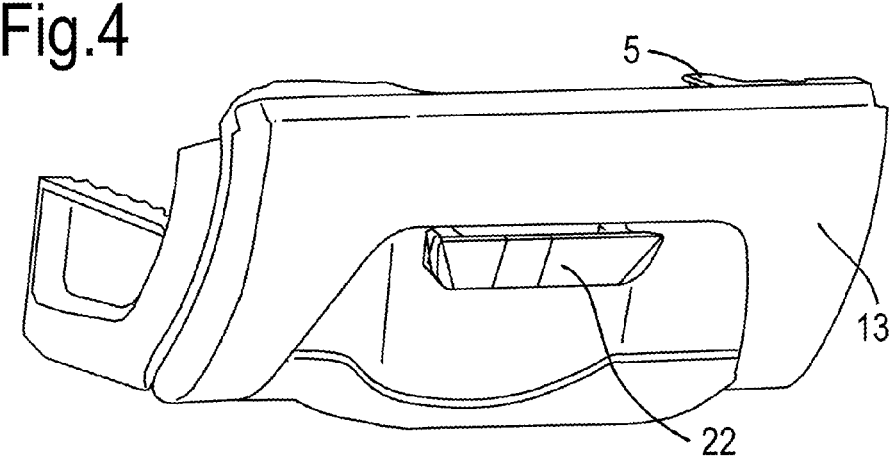
FIG. 4 is a front view of the cassette device.

The frame 5 of the cassette device comprises a wall 13 (see FIG. 4) and internal wall structures 8 forming curved guiding members positioned upstream of the take-up hub 7 for guiding the backing paper through the print head mechanism in the printing device and over a peel edge 14. When mounted onto the printing device (see FIG. 5) of the weighing scale, the wall 13 of the cassette device forms part of the side wall of the weighing scale housing (see FIG. 2). The feed hub 6 and the take-up hub 7 are rotatably mounted to the wall 13 of the frame 5. The curved guide members 8 have a substantially 'U' shaped cross section for accommodating a drive roller 15 in the printing device 3. Unlike prior art cassette devices, whereby the drive roller and the take-up hub are both in the cassette device and are mechanically linked by means of a gearing assembly or drive belt likewise in the cassette device, in the present invention the drive roller is in the printing device. One leg 8a of the U shaped guide member 8 is inclined for feeding the backing paper and label towards the print-head and the other leg 8b is substantially vertical for feeding the backing paper sharply away from the peel edge 14 and towards the take-up hub 7. In addition to the internal wall structures, the cassette device 2 further comprises a guide roller 16 for guiding the backing paper over the curved guide members 8. Further features include locating members 17a for cooperating with corresponding locating members 17b in the print device (see FIGS. 3 and 5). In the particular embodiment, the locating members 17a and 17b are shown as locating pins receivable in corresponding depressions in the cassette device.

The backing paper takes the following journey from the feed hub 6 over the curved guide members 8. Firstly, the backing paper is fed over the inclined portion 8a of the guide member 8 and over the gap 18 between the legs to define an area 19 between the legs 8a, 8b for accommodating the drive roller 15 in the printing device 3. At this point, the backing paper together with the label is pinched between the drive roller 15 below and the print head mechanism 20 directly above, when the cassette device is inserted into the printing device 3. Alternatively, the drive roller can co-operate with an idler or pinch roller to pinch the labels/backing paper. This may be mounted on the print head mechanism, so that the nip thus formed with the drive roller 15 is openable by the displacement of the print head mechanism, to allow removal of the cassette.

Figure 18:
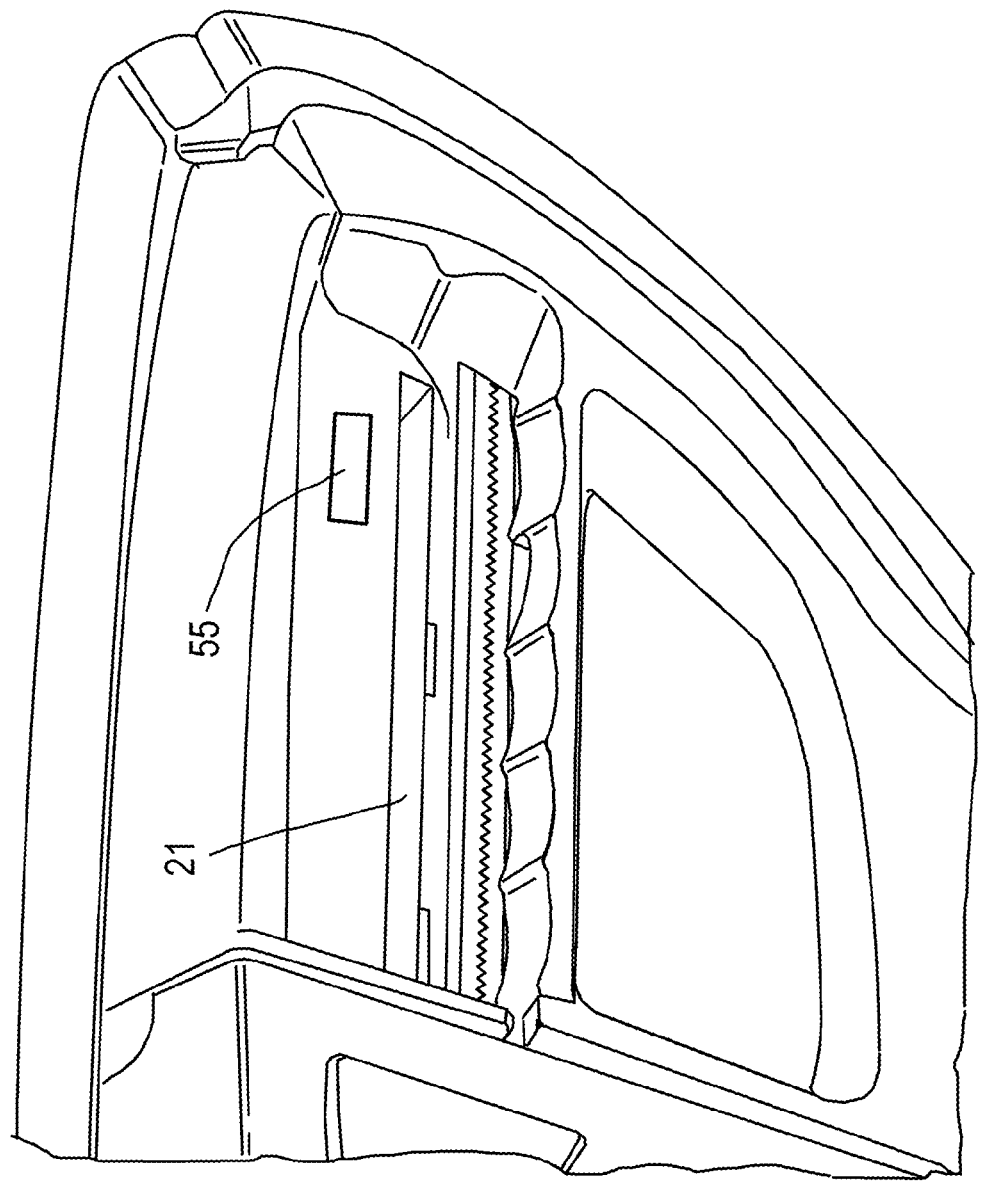
FIG. 18 shows the dispensing aperture of the printing device.

One end of the vertical leg 8b forms the peel edge 14 for separating the label from the backing paper. As the backing paper passes over the peel edge, it changes direction transversely away from the peel edge. The combination of the relative stiffness of the label and the change in direction of the backing paper causes the label to separate from the backing paper as it is fed over the peel edge 14. From the peel edge, the printed label exits a dispensing aperture 21 (see FIG. 1 or 2 and FIG. 18). Finally, the expended backing paper without labels is fed around the curved guide member 8 back towards and onto the take-up hub 7 downstream of the drive roller 15.

The outward side of the wall 13 of the cassette device comprises a handle 22 (see FIG. 4) for releasably locking the cassette device in position in the printing device. In the particular embodiment, the handle 22 simultaneously operates an actuation mechanism 23 for displacing the printing head mechanism 20 (see FIGS. 7 and 8). The actuation mechanism further comprises a detent (see FIG. 10) for engagement and disengagement with a latch 31 for resisting removal of the cassette device from the printing device. The actuating mechanism 20 comprises a protrusion 24 in the form of a finger having a cam surface 25, FIG. 9, for urging the printhead mechanism 20 against the drive roller 15 in the printing device 3 or, when a label is pinched between the print head 26 and the drive roller 15, driving the print head mechanism towards the label in use. The handle 22 is outwardly moveable relative to the remainder of the cassette device, to cause the protrusion 24 to retract from the print head mechanism 20, and movable inward to cause the protrusion 24 to displace the print head mechanism 20. Simultaneously, a locking protrusion 27 cooperating with the handle 22 moves from a refracted position in which the cassette device 2 is allowed to be removed from the printing device 3, and a forward position to lock the cassette device in the printing device. In the particular embodiment, the handle 22 is attached to the protrusion 24 for displacing the print-head mechanism 20 and to the locking protrusion 27 for actuating the detent (explained later). However, other suitable means for the handle to cooperate with the print-head mechanism and the detent are permissible.

Figure 5:
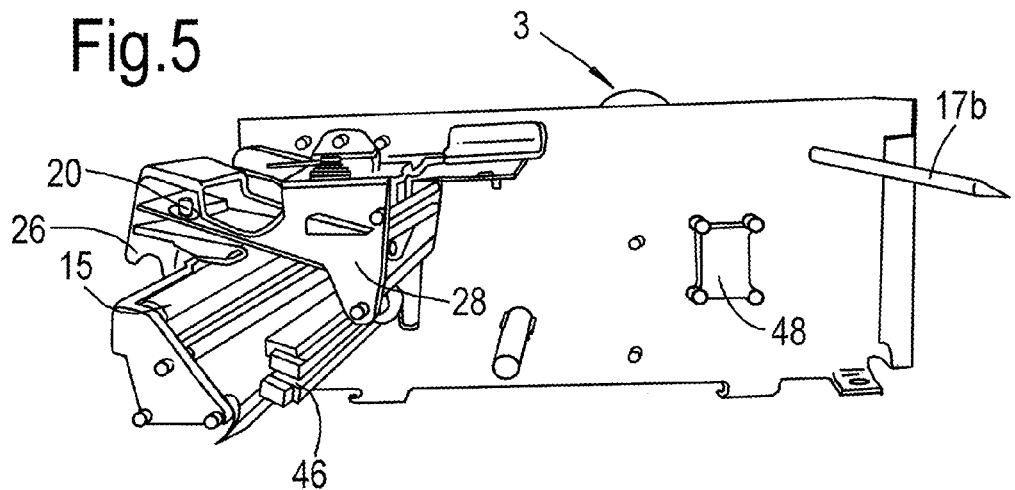
FIG. 5 is the front view of the printing device of the weighing balance of FIGS. 1 and 2.
Figure 8:
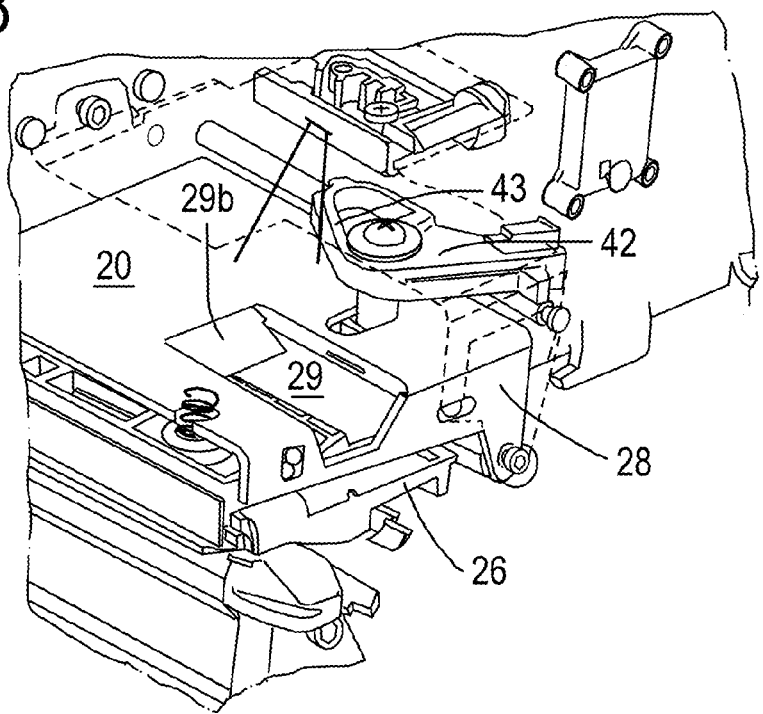
FIG. 8 shows further details of the print head mechanism.
Figure 9:
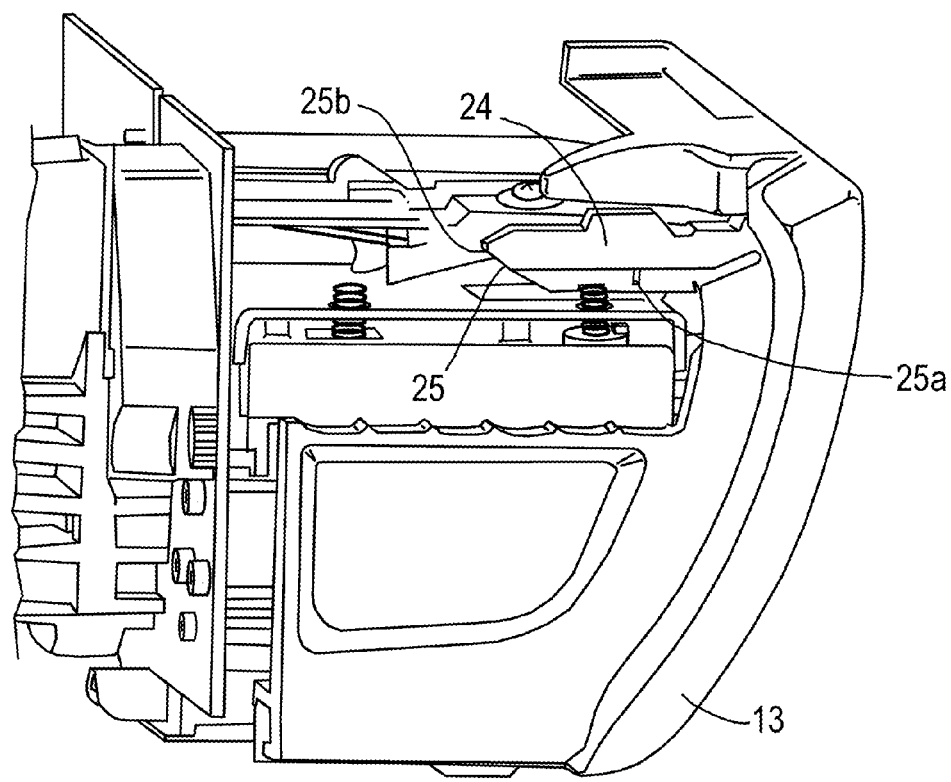
FIG. 9 shows the actuating mechanism of the cassette device engaged on the print head mechanism of the printing device.

The print head mechanism 20 comprises a print head carrier arm 28 movable from a first position in which the print head is spaced apart to define a gap between the drive roller and the print head and a second position in which the print head 26 is urged against the drive roller 15 or label in use (see FIGS. 5 and 8). In the particular embodiment, the print head carrier arm 28 is pivotably moved when the print head mechanism is displaced by the actuating mechanism. The print head mechanism carrier arm 28 is resiliently biased towards the open (upward as shown) position (see FIG. 5). However, it is not necessary that the print head mechanism is pivotably mounted and it can be made to move between open (cassette and label/backing paper disengaging) and closed (cassette and label/backing paper engaging) positions by other means readily apparent to those acquainted with this technology, e.g. by translation along suitable linear guides/guideways. The size of the gap between the print head 26 and the drive roller 15 in the open position is necessary to prevent the backing paper or labels from snagging or fouling against the either the print head 26 of the print head mechanism 20 or the drive roller 15 when the cassette device is inserted into or removed from the printing device (see FIG. 5). The cam surface 25 of the protrusion or finger 24 cooperates with a depression 29 in the print head carrier arm 28 to cause the print head carrier arm to move from the open position to the closed position when the cassette is inserted into the printing device and the cassette handle is pushed in as described above. As shown in FIG. 9, the finger has a flat underside 25a and a wedge shaped tip portion 25b for cooperating with a corresponding surface of the depression 29 in the print-head carrier arm 28. As the cassette device 2 is inserted into the printing device 3, the wedge shaped portion 25b engages with the depression 29 on the print head mechanism carrier arm 28 to cause the arm 28 to move downwards against the resilient bias towards the closed position. At this point the print head 26 is not fully engaged with the drive roller 15 or the backing paper/label and a small gap still exists between the print head 26 and the backing paper/labels. Further movement of the protrusion 24 over the depression 29 is achieved by pushing the handle 22 from the outward, retracted position to the forward, engaged position so that it is flush with the wall surface 13. This causes the tip portion 25a to ride over the depression 29 and engage with an inclined surface 29b at the inner end of the depression 29 to cause the print head 26 to fully engage against the drive roller 15 and any intervening labels/carrier paper (see FIGS. 8 and 9). The small gap permits the removal or insertion of the cassette device without causing the internal components of the printing device such as the drive roller and print head mechanism to snag or foul or rub against the backing paper or the labels. Thus, is it only when the cassette device is fully inserted into the printing device such that the backing paper and labels are located between the drive roller/platten and print head mechanism, that the print head is allowed to fully engage with the backing paper and labels by movement of the handle in the inward direction.

Figure 10:
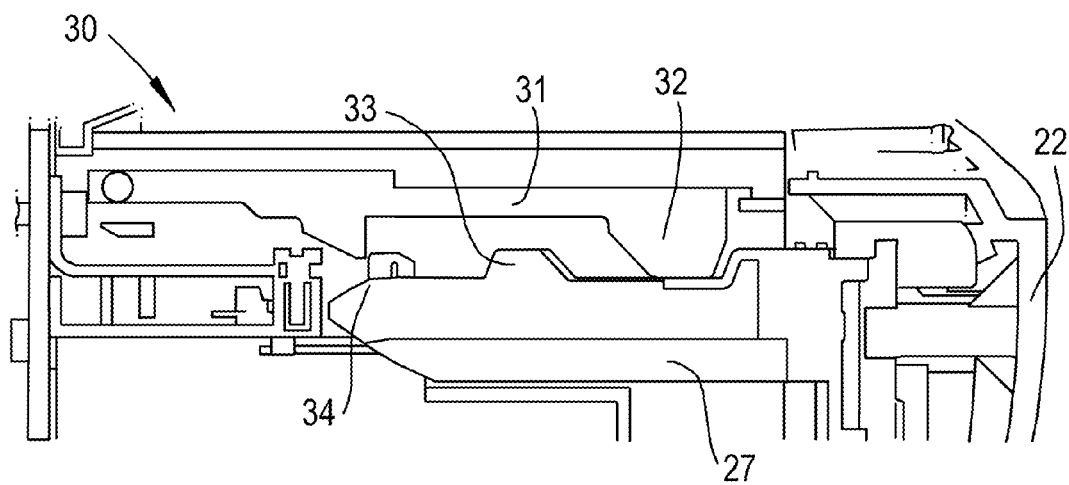
FIG. 10 shows the detent for resisting removal of the cassette device from the printing device.

In addition to actuating the print head mechanism, the handle also actuates a detent 30 for resisting removal of the cassette device from the printing device. As shown in FIG. 10, the detent 30 comprises a locking finger 27 attached to the handle 22 and moveable from a forward position in which it engages with a pivotable latch 31 downwardly biased in the printing device, to a refracted position in which it disengages from the latch 31. The latch 31 comprises a wedge shaped head 32 which engages with a corresponding wedge shaped cam surface 33 on the locking finger 27 to cause the latch 31 to lift against its biasing means and latch onto the locking finger 27, thereby resisting the movement of the cassette device 2 out of the printing device 3. To provide an indication of full insertion of the cassette device onto the printing device, the printing device further comprises a micro switch 34 mounted in the path of the locking finger such that when the cassette is inserted onto the printing device and the handle is pushed in, the micro switch is actuated.

Figure 7:
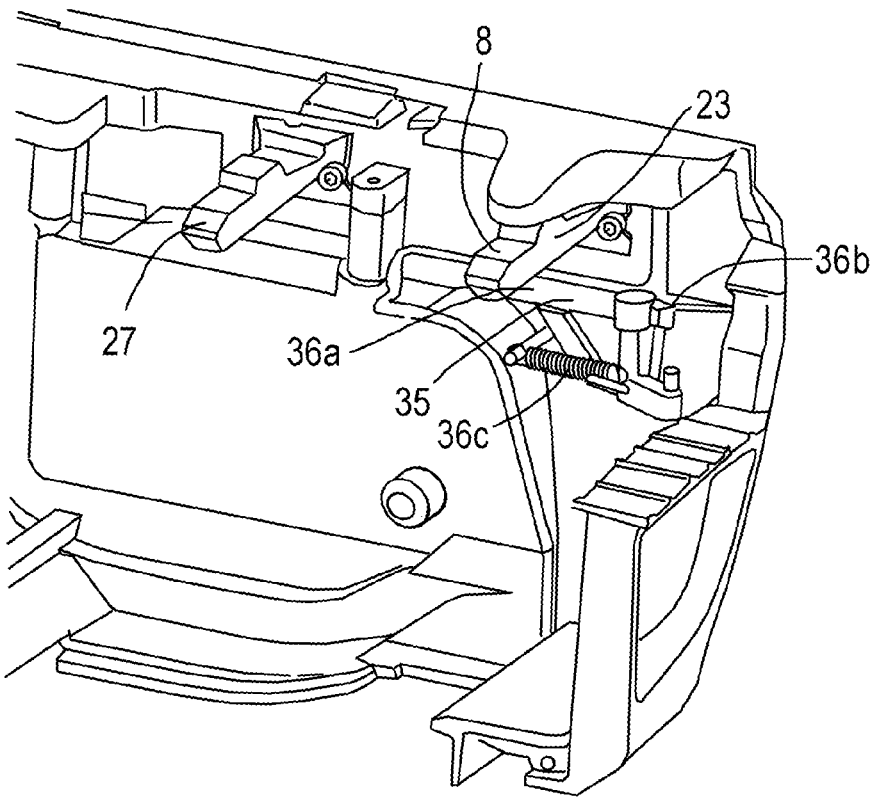
FIGS. 7 and 7a show the actuating mechanism of the cassette device.
Figure 7A:
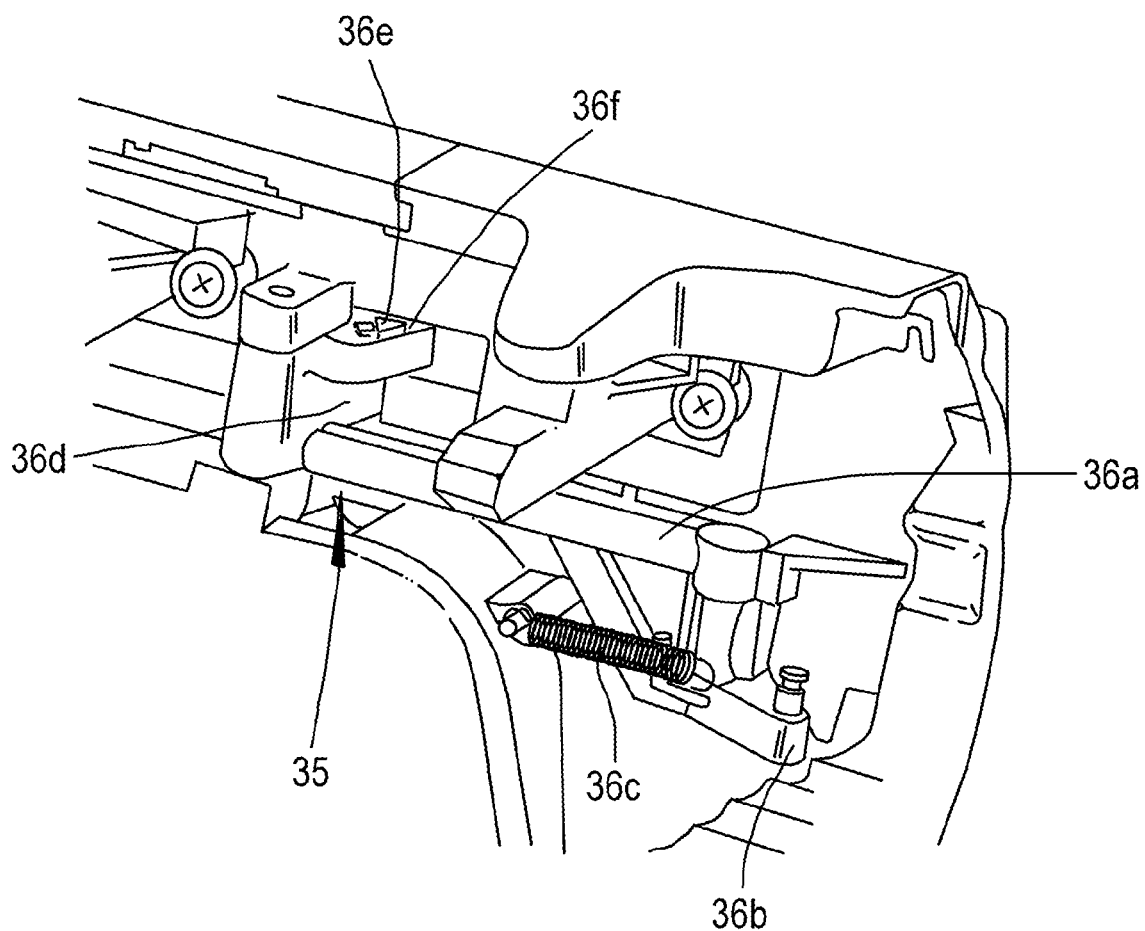

To prevent the handle being accidently pushed to the inward locking position whilst the cassette device is removed from the printing device (as this would cause snagging of the labels/backing paper with the print head mechanism and drive roller in the printing device), the actuating mechanism further comprises an interlock 35 (see FIGS. 7 and 7a). The interlock 35 comprises a pivotally mounted interlock arm 36a, an actuating arm 36b and a spring 36c having one end attached to the frame 5 of the cassette device and the other end connected to the actuating arm 36b; all mounted within the cassette device 2. The spring 36c biases the interlock arm 36a into engagement with a locking swivel 36d and thereby prevents the handle from being operated, i.e. from accidently being pushed inwards. A pin 36e attached to the handle slides in a guide slot 36f so that as the handle moves inward or outward relative to the cassette body, the locking swivel 36d rotates about a generally vertical axis as shown. When the cassette is removed from the printing device, the free end of the interlock arm 36a is biased into engagement with (into the rotation path of) the locking swivel 36d and prevents it from rotating. When, on the other hand, the cassette device is fully home in the printing device, the actuating arm 36b engages a stop on the printing device causing the end of the interlock arm 36a to swing clear of the locking swivel 36d against the bias of the spring 36c, allowing the handle to be pushed in relative to the cassette body.

To ensure correct positioning of the cassette device in the printing device of the weighing scale, the cassette device further comprises locating members 17a receivable in or cooperating with corresponding locating members 17b in the printing device or the weighing scale housing. In the particular embodiment, the locating members are shown as pins in the printing device receivable in corresponding depressions in the cassette device.

Figure 15:
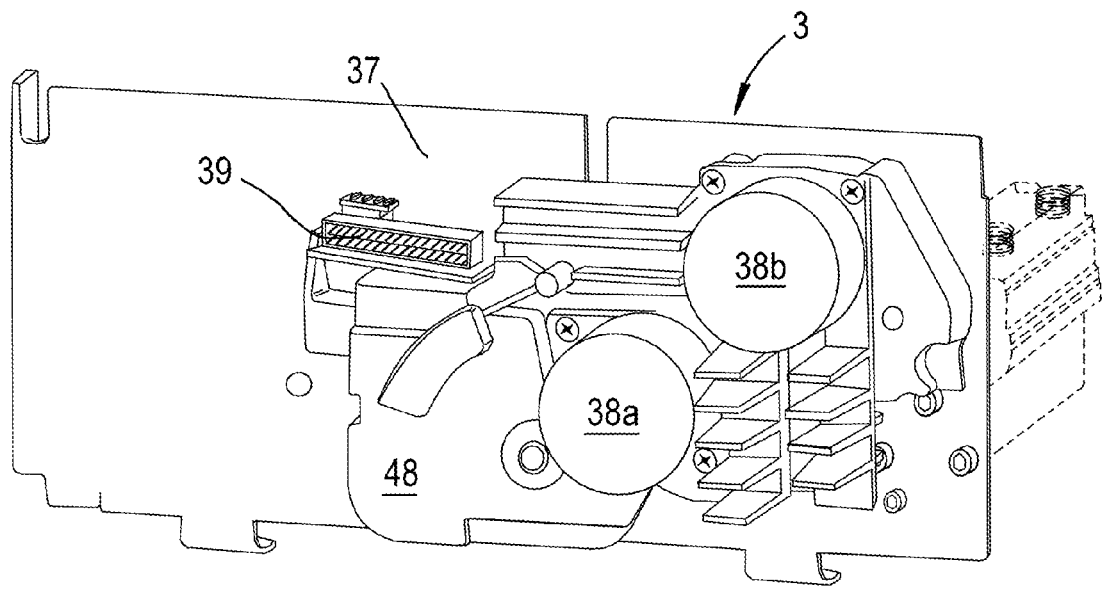
FIG. 15 shows the rear view of the printing device showing the motors for driving the drive roller and the take-up hub.

The print head mechanism of the printing device 3 is mounted to a frame or chassis 37 (see FIG. 15). The chassis 37 also carries the motors 38a, 38b for driving the take-up hub 7 and the drive roller 15 positioned upstream of the take-up hub 7. In the particular embodiment shown in FIG. 15, the take-up hub 7 and the drive roller 15 are driven by two motors 38a, 38b which are mechanically independent, although interlinked by a control system as further explained later. Preferably the motors are stepper motors. This enables a processor to accurately control the motor positions without any feedback mechanism. The printing device 3 has interface communication means 39 to interface with a processor such as an electronic control unit (ECU) in the printing device or the weighing scale. In the particular embodiment, the take-up hub is driven by a splined shaft 12 (see FIG. 6) that is receivable in a centre hole 11 in the take-up hub 7 with corresponding spline receiving grooves. The drive roller 15 is located below the print head 26 of the print head mechanism 20 such that when the cassette device is inserted into the print device, the backing paper with labels is pinched between the print head of the print head mechanism and the drive roller. In operation, the drive roller 15 drives the backing paper paid out from the feed hub past the print head mechanism 20 and over the peel edge 14.

The pivotable print head carrier arm is held rigidly in the closed position by the handle 22 and associated actuating mechanism 20. In order to resiliently bias the print head 26 against the drive roller or the backing paper/label in use, there is a resilient mounting between the other components of the print head mechanism and the print head carrier arm (see FIG. 11). In the particular embodiment the print head is resiliently mounted by means of compression coil springs 40 positioned between the remainder of the print head mechanism and the carrier arm. Where a strip of backing paper does not extend across the full width of the print head 26, a portion of the print head surface may not fully rest in contact with the backing paper resulting in variation in the pressure of the print head across the width of the backing paper, i.e. the edge of the backing paper closest to the centre of the print head experiences more pressure than the backing paper edge furthest away from the centre of the print head, resulting in undesirable variation in the printing density, especially in the case of a thermal print head. This differential pressure can be eliminated by providing one or more of the springs 40 with an adjustment mechanism 41 for adjusting the urging force of the associated spring acting on the print head. The spring adjustment mechanism 41 is in form of a rotatable washer having a cam surface such that rotation of the spring adjustment mechanism causes the height of the washer relative to the print head to change, thereby varying the compression of the associated spring.

By the very nature of the set up of the cassette device and the print head mechanism in some prior art devices, it is inherent that the print head has to be separately urged against the backing paper/label once the cassette device has been inserted into the printing device. However, in the present invention the print head carrier arm is urged towards the drive roller by a one step operation of the cassette device being inserted into the printing device. In order to clean the print head it is necessary that the print head 26 of the print head mechanism 20 is mechanically urged against the drive roller or cleaning media pinched between the drive roller and the print head. To enable the print head to be cleaned, the present invention additionally provides a rotational cam 42 (see FIG. 8) to manually urge the print head against the drive roller or cleaning media. In the illustrated embodiment, the rotational cam 42 comprises an arm 43 one end of which has a cam surface for cooperating with the print head mechanism carrier arm. Manual rotation of the cam causes it to urge the print head mechanism carrier arm downwards and thereby causes the print head to press against the drive roller or cleaning media held between the two.

Figure 11:
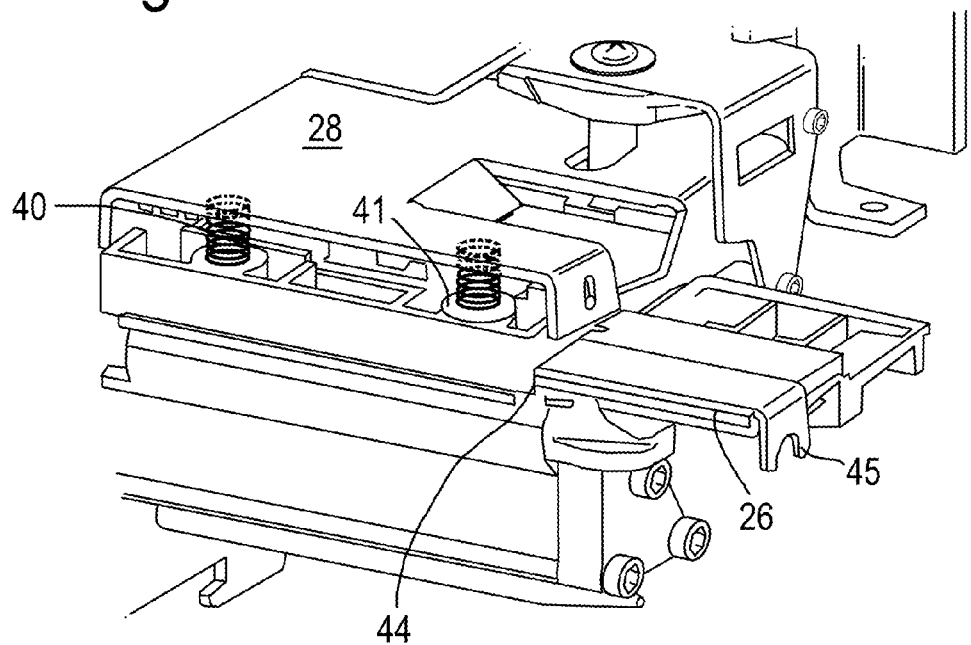
FIG. 11 shows the print head mechanism and print head in the printing device.

Over time, the print head gradually deteriorates through use and requires replacing periodically. In prior art systems, this requires the use of tools as the print head is held in the print head mechanism by fasteners such as screws. Not only does this require tools to remove the old print head but the work required introduces an unnecessary delay. The present invention has overcome this problem by eliminating the need for any tools to remove or replace the print head. As shown in FIG. 11, the print head mechanism has grooves 44 for slideably mounting the print head 26. The print head 26 is held firmly within the print head mechanism by the frictional engagement of the print head within the grooves 44. Additional support and retention can also be provided by the frictional engagement of the electrical contact pins (not shown) of the print head in sockets (not shown) in the print head mechanism, which extend parallel to the grooves 44 and contact pins. To remove the print head, the operator pulls on a print head handle 45 to disengage the electrical contacts from the sockets. Further pulling causes the print head to eventually slide free from the grooves. A new print head can then be inserted in the reverse of the way in which the old one was removed, without the need to use any tools. In the particular embodiment, the print head is a direct thermal print head of known kind whereby the print head applies heat to a heat sensitive paper causing developer in the paper to turn black or grey depending upon the intensity of heat applied.

Alternatively, printing could be by thermal transfer e.g. by melting a thermal ink ribbon so that the ink is fused to the label. However, the print head is not restricted to any particular printer types and other printers known in the art to enable printing labels are permissible—dot matrix or other impact, inkjet, laser, etc.

To prevent the print head printing in the gap between individual labels on the backing paper, the printing device additionally comprises a gap sensor 46 (see FIG. 5) adjacent the drive roller to detect gaps between the labels. The gap sensor generates a signal indicative of the position of the labels and/or backing paper along its feed path. A controller receives signals from the gap sensor to control movement of the drive roller to suitably position each label adjacent the print head.

Feed Reel Diameter

By periodically measuring the radius or the diameter of the feed reel, an indication of the amount of the backing paper on the feed hub can be determined and can be used as an indication of when the labels are about to run out. The radius of the feed reel (including the remaining backing paper/labels wound on it) is given by:

$$r = v/\omega \quad (12)$$

Where r is the radius of the feed reel including labels etc.;

v is the linear velocity of the backing paper through the cassette device;

ω is the angular velocity of the feed hub.

Knowing the linear velocity, v of the backing paper through the cassette device and the angular velocity, ω of the feed hub, the radius, r of the feed reel can be calculated by means of the above equation. The linear velocity is determined to be the speed at which the backing paper is advanced by the drive roller 15. By means of a stepper motor arranged to drive the drive roller, the controller is able to calculate the linear velocity of the backing paper by the following means. For example, each time the drive motor is stepped, the backing paper is advanced by a predetermined amount and from the number of steps the drive motor rotates over a period of time, the linear velocity of the backing paper through the cassette device can thus be determined. Taking a numerical example, each time the drive motor is stepped the backing paper may advance by e.g. 0.125 mm. During printing, the stepper motor is typically run at 1200 steps/sec, which means the linear velocity is calculated to be 150 mm/sec. To determine the angular velocity of the feed hub 6, the feed hub comprises a marker 47 such as a notch which cooperates with a sensor 48 (see FIGS. 5 and 11) mounted on the chassis of the printing device. The sensor could be a transmitter/receiver whereby a signal transmitted to the feed hub is reflected back to the sensor to generate a pulse each time the notch or marker passes the sensor. Each pulse represents one revolution of the feed hub and thus the frequency of the pulses is proportional to the angular rotation speed of the feed hub. Thus the angular speed is given by:

$$2\pi \times p_{feed\ hub} = \omega_{feed\ hub} \quad (1)$$

Where $p_{feed\ hub}$ is the number of pulses over a time period from the signal generating means, $\omega_{feed\ hub}$ is the angular rotation of the feed hub.

Figure 12:
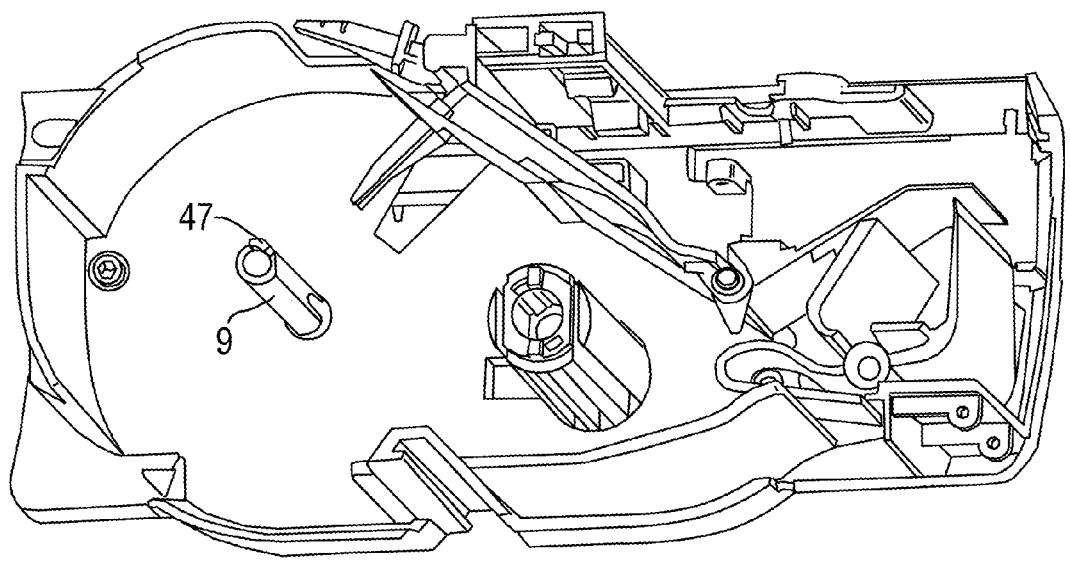
FIG. 12 shows the cassette device with the outer feed hub sleeve removed.

As the calculated radius r includes the backing paper and labels wound on the feed hub, to determine the amount (depth) of the backing paper on the feed hub, the inner core radius or diameter of the feed hub is required. Rolls of labels come in different sizes having different core radii or diameters. In order to accommodate these, the feed hub comprises an inner feed hub core and a removable outer feed hub sleeve each having a predetermined diameter. To determine whether the roll of labels is on the inner feed hub core alone or on the core plus sleeve, the core and sleeve have respective markers. In the particular embodiment, each of the core and sleeve comprises a single marker (see FIGS. 3, 12, 13 and 14). Thus when both the core 9 and sleeve 10 are present, the sensor detects two pulses per rotation of the feed hub whereas when the sleeve 10 is removed (see FIG. 12), the sensor detects one pulse per rotation. FIGS. 13 and 14 show respectively the pattern of pulses from the core 9 alone and from the core 9-plus-sleeve 10. The inner core 9 when used alone generates a regular array of pulses such that the interval x between the pulses is uniform which is an indication that only the core is being used. However, an irregular array of pulses as shown in FIG. 14, whereby the intervals x between the pulses are not uniform, would indicate that the sleeve 10 is present. It is essential that the markers on core and sleeve are not located at 0 or 180° to each other otherwise the pulses from both markers will coincide or be regular so in the latter case the controller would assume that the respective pulses from the core and sleeve represent two separate revolutions of the feed hub. The core 9 and the sleeve 10 have a predetermined diameter. For example, typically the core is 13 mm in diameter and the sleeve is 38 mm in outer diameter. Thus knowing the overall radius of the feed reel (i.e. including wound paper etc.) and the feed hub diameter, the size of the roll of labels on the feed hub can be determined. Other means to indicate whether the feed hub core alone or the core and sleeve are present can be used, such as two sensors for detecting respective markers on the core and sleeve. When the size of the roll of labels approaches a predetermined minimum, the controller indicates to the operator that the roll of labels is about to run out. Alternatively, a real time display can be generated indicating the size/depth of the roll of labels on the feed reel.

Take-up Control and Sensing

As described above, the printing device 3 in the particular embodiment uses two stepper motors 38a, 38b (see FIG. 15). The drive motor 38b drives the capstan or drive roller 15 and takes the lead role in controlling the movement of the backing paper past the print head mechanism so that the printing is correctly located on the label. The take up motor 38a, on the other hand, takes a subordinate role, in that it follows the drive motor such that the tension of the backing paper is within a desired range to effect release of the label when it passes over the peel edge. Within this range the paper is not too slack so as to prevent label peeling or cause potentially troublesome looping of the paper within the cassette, or too taut so that the paper may tear, as well as putting undue stress on the drive motors and other components of the cassette and printer devices.

In an ideal situation the surface linear speed of the take-up reel is equal to the surface linear speed of the drive roller 15 and this may be the case when the take-up hub is empty, i.e. on the initial start up of the printing device. However, as the backing paper is continually wound onto the take-up hub, the reel radius increases and if the hub rotational speed remains constant, the reel surface linear speed increases. Without any means to provide for differential rotational speeds between the take-up hub and the drive roller, there is a risk that the drive roller and take-up hub will over tension the backing paper leading to tearing and undue stress. Moreover, there is a problem to be addressed of residual slack in the backing paper arising as a result of a label being tugged out of the printing device by a user before it is adequately peeled from the backing paper. This can create a loop of backing paper between the take-up reel and the drive roller, if the take-up hub is not speeded up rapidly enough to follow the artificially increased backing paper linear speed. The next label(s) may not be peeled at all and will therefore be carried by the backing paper onto the take-up reel.

Figure 16:
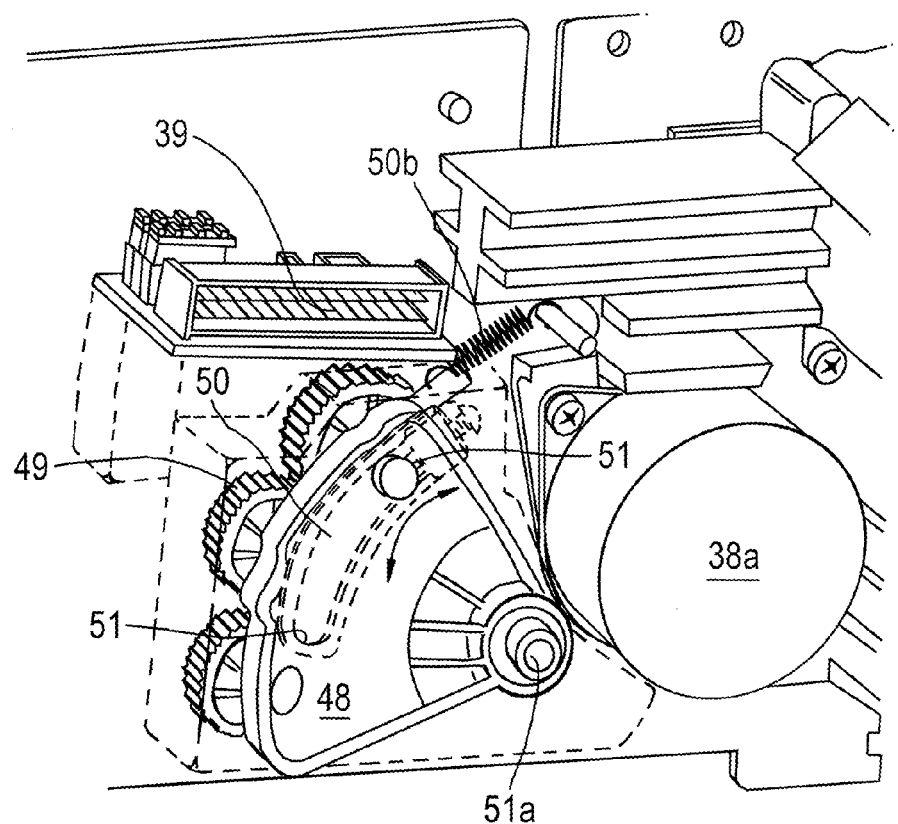
FIG. 16 shows the torque sensor mounted to the take-up motor for monitoring the torque on the take-up motor.

Unlike prior art devices which maintain a constant drive torque on the take-up reel, the present invention helps to maintain a more constant tension in the backing paper between the drive roller and the take-up reel. The tension in the backing paper is not directly sensed. Instead a torque sensor 48 built into a gear box 49 drivingly connecting motor 38a to the take-up hub is used (see FIGS. 15 and 16). The torque sensor 48 includes planetary gearing (i.e. gearing whose shaft(s) is/are free to move in an arcuate path) carried by an idler segment 50 rotatable through an acute angle about a sun gear shaft 51a, between stops 51. The reaction torque on the segment 50 is proportional to the torque on sun gear shaft 51a. The segment 50 is biased in a clockwise direction as shown in FIG. 16, by a tension spring 50b. Assuming that the spring 50b substantially obeys Hooke's Law (displacement being proportional to applied force) and the movement of the idler segment 50a is small, then the relative position of the idler 50 between the stops 51 is substantially proportional to the torque on the shaft 51a, which is in turn proportional to the torque on the take-up hub. The angular position of the segment can be sensed e.g. optically, and a resulting signal can be supplied to the printing device control circuitry. Note that movement of the idler segment 50 also results in differential movement between the gearbox input and output shafts. Such differential movement can be used to accommodate mismatches in the surface movement of the drive roller 15 and of the take-up reel as the spent backing paper accumulates, as further explained below. Although the torque sensing arrangement just described is relatively sophisticated, at its simplest, the torque sensor/differential movement accommodating means could for example comprise a flexible shaft or torsion spring in the take-up hub drive train, whose deformation under torsional load is measurable. Other suitable torque sensors/resilient rotational drive members could also be used.

In use of the machine, starting with a full roll of labels, the idler segment 50 is in the "no-torque-change position". That is, the take-up spool is empty, the rotational speed of the take-up hub is in synchronisation with the drive roller (so that their surface linear speeds match) and the tension in the backing paper is at its initially set, correct value. As backing paper builds up on the take-up reel, this correct operation state can break down. The surface speed of the take-up reel is governed by the linear speed of the backing paper which in turn is governed by the speed of the drive roller or capstan 15. Therefore as the radius of the take-up reel increases as paper accumulates, the take-up hub angular speed must decrease relative to that of the drive roller 15. If the take-up hub drive motor 38a angular speed is held constant (i.e. the driving frequency to the stepper motor 38a is fixed) the slowing of the take-up hub relative to its drive motor is accommodated by differential movement of the gearbox idler segment 50. This differential movement takes place against the bias of the spring 50b and therefore represents an increase in the torque applied to the take-up hub by the stepper motor 38a. The angular displacement of the idler segment 50 is sensed by the photo sensor, such that:

$$T_q = D \times K \qquad (4)$$

Where $T_q$ is the torque at the take-up hub,

D is the angular displacement of the torque sensor, as the idler segment moves anticlockwise with increasing torque, K is a constant that defines the angular displacement of the idler segment for a given change in torque and is measured in Rads/Nm.

Thus the change in the angular position of the idler segment, $\Delta D$, will also be proportional to the change in torque:

$$\Delta T_q = \Delta D \times K \tag{6}$$

Where $\Delta T_q$ is the change in the torque at the take-up hub, $\Delta D$ is the change in the angular position of the idler segment.

From the take-up hub torque, the tension imparted to the backing paper can be calculated from the equation:

$$T_n = T_q/r \tag{3}$$

where $T_n$ is the tension on the backing paper,
r is the radius of the take-up reel, including the backing paper taken up.

From equation 3, it can be seen that as the radius r of the paper on the take-up hub increases, a larger torque, $T_q$, will be required to maintain the same desired tension on the backing paper. In order to maintain the correct paper tension, the radius of the take-up reel needs to be continually updated. To do this, the controller starts with an assumed radius equal to the radius of the (empty) take-up hub and controls the angular velocity of the take-up motor in an attempt to achieve the desired torque computed from the assumed radius and desired tension. At each step of the drive motor 38b, the torque change, $\Delta T_q$, can be sensed by the torque sensor 50 and used to compute an improved value for the take-up reel radius, r. As already alluded to above, essentially the mismatch between the linear motion of the backing paper and the angular motion of the take-up hub drive is taken up in the angular displacement of the torque sensor (idler segment). Equating change in angular displacement with the mismatch in take-up hub drive rotational speed and paper linear speed over a time interval of interest, t, and where $\Delta D$ is small, we get:

$$r \cdot \Delta D = r \cdot \Omega \cdot t - v \cdot t \text{ and hence:}$$

$$\Delta D = (\omega - v/r) t \tag{8}$$

where $\omega$ is the angular speed of the take-up hub and is easily derived from the angular speed of the stepper motor 38a,
v is the linear speed of the paper and can be derived from the angular speed of the motor 38b and the known radius of the drive roller 15, and
r is the take-up reel radius, including accumulated paper.
$(\omega - v/r)$ is the mismatch in the rotational speed of the take-up hub relative to the drive motor as a result of the increased radius on the take-up reel.

Making the radius, r, of the take-up reel the subject in equation 8 and substituting for $\Delta D$ from equation 6, the radius of the take-up reel including the backing paper taken up is thus given by:

$$r = \frac{v}{\left(\dfrac{\Delta T_q}{t \times K}\right) - \omega} \tag{11}$$

$T_q$, the tension can thus be calculated. The controller continuously monitors the change in torque experienced by the take-up reel, $\Delta T_q$, which in turn is used to continuously update the radius, r, and thus maintain the desired tension by varying the speed of the take-up motor 38a in accordance with equation 8:

$$\omega = v/r \tag{10}$$

Of course, rather than substituting for $\Delta D$ when deriving eqn. 10 from eqn. 9, $\Delta D$ can be retained, in which case eqn. 9 results:

$$r = \frac{v}{\omega - \dfrac{\Delta D}{t}} \tag{9}$$

Thus the updated r values can be obtained simply by monitoring the differential angular movement of the take-up hub drive, without knowing either actual changes in the hub torque, or the torque/displacement characteristic K of the hub drive resilient connection. However an actual torque value and displacement characteristic will be needed in setting the initial resilient connection displacement D and corresponding paper tension $T_n$ using eqn. (5):

$$D = r \cdot T_n/K \tag{5}$$

When the machine is shut down, the last computed value of r can be remembered, for use in eqns. 5, 11 (or 9) and 10, when the machine is next re-started.

Figure 17:
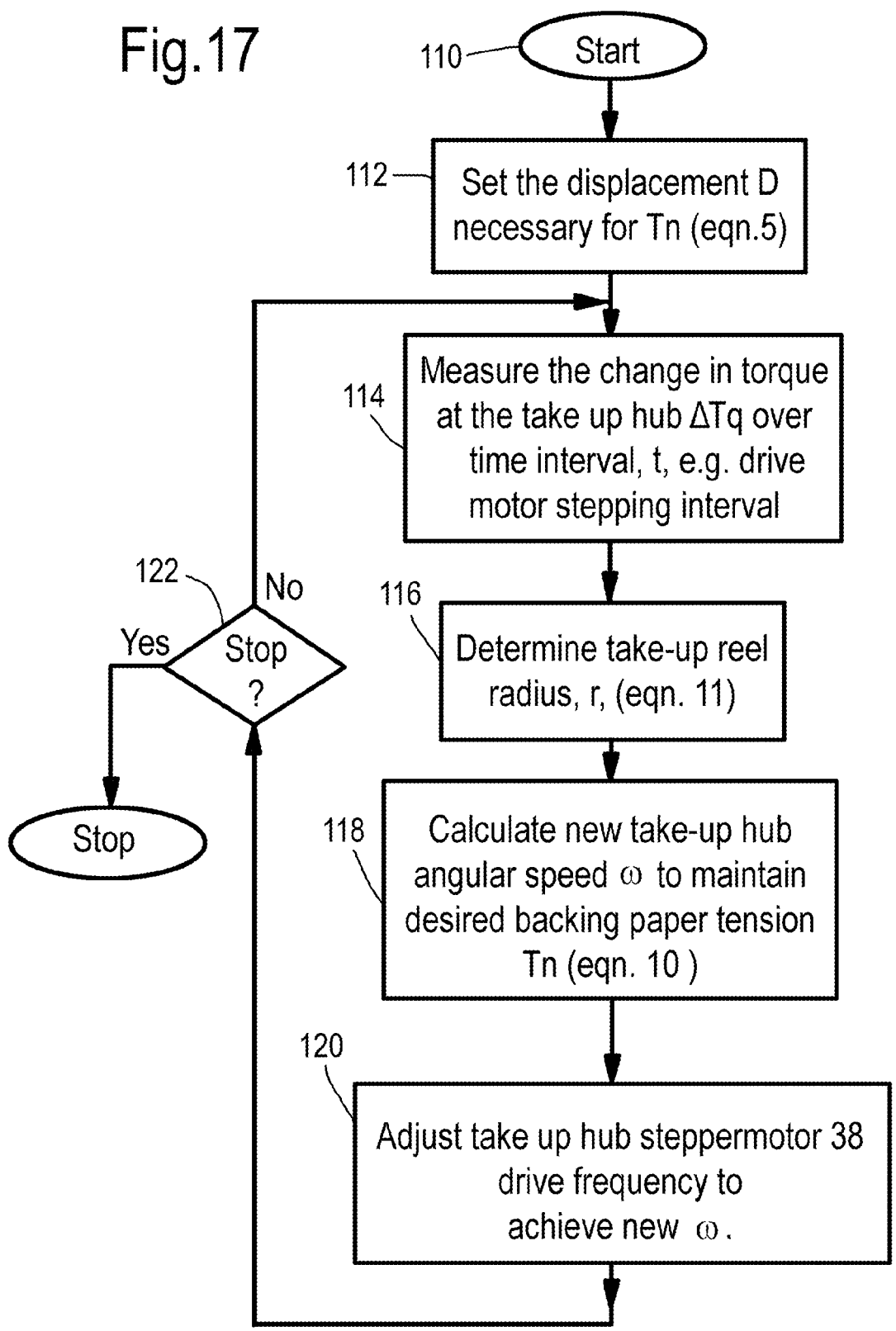
FIG. 17 is a flow chart showing the steps for controlling the tension imparted on the backing paper between the drive roller and the take-up hub.

FIG. 17 is a flowchart showing the steps in an iterative process for maintaining the tension in the backing paper between the drive roller and the take-up reel substantially at a desired value. The process starts at step 110 when the printer device is activated with a full label roll on the feed hub and no spent backing paper on the take-up hub. In step 112 the initial displacement D of the take-up drive resilient connection necessary to achieve the desired paper tension $T_n$ is set. In step 114 the change in torque at the take-up hub $\Delta T_q$ over a suitable time interval t, for example the drive roller motor stepping interval, is measured using the torque sensor 50. In step 116, the updated take-up reel radius is determined using eqn. 10. At step 118 the new take-up hub angular speed $\omega$ is calculated as required to maintain the desired paper tension $T_n$, using eqn. 8. At step 120 the drive frequency to stepper motor 38a is adjusted to achieve the desired new hub angular speed $\omega$. The process then loops back to step 114 until stopped at step 122.

If a label is tugged from the printing device to accidently create a loop of the backing paper within the printing device, the controller will sense a drop in the torque on the take-up hub also signifying a drop in tension of the backing paper between the drive roller and the take-up reel. The controller implementing the control process of FIG. 17 will then send signals to the take up motor to make the necessary angular speed adjustments to restore/maintain the desired paper tension.

Label Sensor

It is necessary that selected areas of the label are brought into proper alignment with the print line of the print head. A typical label is divided into areas surrounded by borders, for printing information associated with the commodity such as price, weight, price per unit weight, bar code etc. Typical means for indexing or metering each label mounted on the backing paper utilises a gap sensor positioned along the feed path of the backing paper to sense the gaps between the labels or other indicia on the backing paper or labels, and sends a signal to a controller for actuating the drive mechanism to move the backing paper such that the label is aligned with the print line of the print head. Once a label is printed, the controller actuates the printer drive mechanism to move the label carried by the backing paper over the peel edge whereby it separates from the backing paper and is dispensed through a dispensing aperture such as a slot 21 (see FIG. 18). At this point, a portion of the next label along the backing paper is moved out of register with the print line. A known printing device waits until the operator actuates the printer again, at which point the take-up motor and capstan drive motor automatically drive the take-up reel and the backing paper/labels adjacent the print head mechanism backwards a predetermined distance so that the next label is positioned in register with the print line of the print head. This process ensures that the previous label has been taken, before the next is printed. However, with this arrangement the operator or customer experiences the noise of the printer aligning the label, but no apparent printing activity for a significant time.

In the illustrated embodiment of the present invention, a sensor 55 adjacent the dispensing aperture 21 senses the presence and absence of a label each time one is issued from the slot 21. The sensor 55 is preferably located external of the dispensing aperture 21 to sense the removal the label. The sensor 55 can be a transmitter/receiver which senses reflections from the label surface when present, but any other sensor known in the art for detecting the presence of the label is permissible. As soon as the controller via the sensor senses that the label has been removed, the controller automatically sends instructions to cause the take-up motor to move the next label backwards a predetermined amount such that it is in line with the print line of the print head. This label indexing means reduces the 'dead time' where the printing device is left idle between moving labels into registration for printing and thus, when the operator or the next customer actuates the printing device, they do not have to wait for the motors to reposition the label in line with the print line of the print head but rather, the customer experiences a continuous feed system with reduced noise.

All patents referred to herein, if any, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A cassette device arranged to be removably mounted to or inserted into an opening of an associated weighing scale housing of a weighing scale for cooperation with a printing device, the weighing scale housing having a print-head mechanism and a drive roller, the cassette device comprising;
   a wall, the wall forming at least a part of an exterior wall of the weigh scale housing; and
   a feed hub and a take-up hub rotatably mounted to the wall for cooperating with the drive roller when the cassette device is inserted into the weighing scale, the feed hub and the take-up hub being cantilevered to the wall of the cassette device, and wherein the wall forms a closure for the opening for the weighing scale housing, and wherein the cassette device includes a releasable locking mechanism for releasably locking the cassette device to the weighing scale.

2. The cassette device as claimed in claim 1, wherein the take-up hub is adapted to cooperate with a splined shaft in the printing device for driving the take-up hub.

3. The cassette device as claimed in claim 1, comprising an actuating mechanism for actuating the print head mechanism to move towards the drive roller as the cassette is mounted/inserted.

4. The cassette device as claimed in claim 3, wherein the actuating mechanism comprises a protrusion having a cam surface that registers with the print head mechanism to urge the print head mechanism towards the drive roller.

5. The cassette device as claimed in claim 4, wherein the protrusion is moveable relative to the wall from a retracted position such that the print-head mechanism is spaced apart from the drive roller or label to an extended position to urge the print-head mechanism against the drive roller or label.

6. The cassette device as claimed in claim 5, wherein one end of the protrusion is wedge shaped so as to engage with a sloped surface of the print head mechanism to cause the urging of the print head mechanism against the drive roller or labels.

7. The cassette device as claimed in claim 3, wherein the actuating mechanism further actuates a detent to releasably resist removal of the cassette device from the printing device.

8. The cassette device as claimed in claim 7, wherein the detent comprises a finger having a cam surface which cooperates with a latch in the printing device.

9. The cassette device as claimed in claim 7, wherein the actuating mechanism comprises a handle that cooperates with the detent to simultaneously actuate the detent and the print-head mechanism.

10. The cassette device as claimed in claim 9, wherein the handle is moveable to move the protrusion from the retracted position such that the print-head is spaced apart from the drive roller or labels to a forward position to urge the print-head against the drive roller or labels.

11. The cassette device as claimed in claim 9, wherein the handle comprises an interlock to prevent actuation of the handle when the cassette device is removed from the printing device.

12. A weighing scale, comprising:
   a weighing scale housing;
   a printing device, the printing device including a print-head mechanism and a drive roller, the print-head mechanism and the drive roller located in the weighing scale housing; and
   a cassette device arranged to be removably mounted to or inserted into an opening of the weighing scale housing, the cassette device including a wall, the wall forming a closure for the opening of the weighing scale housing, a feed hub and a take-up hub rotatably mounted to a wall for cooperating with the drive roller,
   wherein the drive roller is drivingly engageable with labels and/or a backing paper in the cassette device.

13. The weighing scale printing device as claimed in claim 12, wherein the print-head mechanism is moveable from a first position in which it is spaced apart from the drive roller or labels/backing paper to a second position in which it is urged towards the labels/backing paper.

14. The weighing scale printing device as claimed in claim 13, wherein the print-head mechanism comprises a carrier arm biased towards the first position.

15. The weighing scale printing device as claimed in claim 14, wherein the carrier arm is pivotally mounted to a chassis.

16. The weighing scale printing device as claimed in claim 14, wherein the carrier arm has means to cooperate with an actuating mechanism of the cassette device to urge the print-head mechanism towards the drive roller or labels/backing paper.

17. The weighing scale printing device as claimed in claim 16, wherein the carrier arm comprises a sloped surface for cooperating with a cam surface of a protrusion of the cassette device.

18. The weighing scale printing device as claimed in claim 13, wherein a print-head is resiliently mounted to the print head mechanism.

19. The weighing scale printing device as claimed in claim 18, wherein the print-head is resiliently mounted to the print-head mechanism by an adjustable spring.

20. The weighing scale printing device as claimed in claim 19, wherein at least one further mounting spring is provided between the print head and print head mechanism, spaced from the adjustable spring in a transverse direction of the labels/backing paper.

21. The weighing scale printing device as claimed in claim 19, wherein the adjustable spring has adjustment means to adjust a biasing force of the print-head against the drive roller or labels/backing paper.

22. The weighing scale printing device as claimed in claim 21, wherein the adjustment means comprises a rotatable member having a cam surface arranged to adjust the deformation of the adjustable spring in use.

23. The weighing scale printing device as claimed in claim 13, wherein the print head mechanism is movable against a print head mechanism bias.

24. The weighing scale printing device as claimed in claim 23, wherein the print head mechanism includes a rotatable member having a cam surface, the rotatable member being rotatable from a first position such that the cam surface engages with the print head mechanism to urge the print head towards a normal operative position against the print head mechanism and a second position to cause the print head mechanism to be spaced apart from the drive roller or labels/backing paper.

25. The weighing scale printing device as claimed in claims 12, wherein the weighing scale includes a drive mechanism for driving the drive roller and the take-up hub, the drive mechanism being a stepper motor.

* * * * *